United States Patent
Tsuji

(10) Patent No.: US 7,937,523 B2
(45) Date of Patent: May 3, 2011

(54) MEMORY SYSTEM WITH NONVOLATILE SEMICONDUCTOR MEMORY

(75) Inventor: Hidetaka Tsuji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 428 days.

(21) Appl. No.: 11/770,344

(22) Filed: Jun. 28, 2007

(65) Prior Publication Data

US 2008/0046639 A1 Feb. 21, 2008

(30) Foreign Application Priority Data

Jun. 30, 2006 (JP) ................................. 2006-182631

(51) Int. Cl.
*G06F 12/00* (2006.01)
(52) U.S. Cl. ................................. 711/103; 711/E12.003
(58) Field of Classification Search .................... 711/103
See application file for complete search history.

(56) References Cited

U.S. PATENT DOCUMENTS

| | | | |
|---|---|---|---|
| 4,680,647 A * | 7/1987 | Moriyama | 386/112 |
| 5,371,885 A * | 12/1994 | Letwin | 707/205 |
| 7,116,578 B2 | 10/2006 | Kanamori et al. | |
| 2005/0281121 A1 * | 12/2005 | Lakhani et al. | 365/230.06 |
| 2006/0064538 A1 * | 3/2006 | Aizawa | 711/103 |
| 2006/0218347 A1 | 9/2006 | Oshima | |

FOREIGN PATENT DOCUMENTS

| | | |
|---|---|---|
| CN | 1141092 A | 1/1997 |
| CN | 1485860 A | 3/2004 |
| JP | 2006-92169 | 4/2006 |

OTHER PUBLICATIONS

U.S. Appl. No. 12/508,992, filed Jul. 24, 2009, Tsuji.

* cited by examiner

*Primary Examiner* — Reginald G Bragdon
*Assistant Examiner* — Hamdy S Ahmed
(74) *Attorney, Agent, or Firm* — Oblon, Spivak, McClelland, Maier & Neustadt, L.L.P.

(57) ABSTRACT

A memory system includes a nonvolatile semiconductor memory and a controller. The memory has a plurality memory blocks each including memory cells capable of holding data. The data in each of the memory blocks is erased simultaneously. The data is written simultaneously in pages in each of the memory blocks. Each of the pages is a set of a plurality of memory cells. The controller transfers write data and a first row address to the memory and issues a change instruction for the transferred first row address and a second row address differing from the first row address. The memory writes the write data into the memory cells corresponding to the first row address when the change instruction has not been issued, and writes the write data into the memory cells corresponding to the second row address when the change instruction has been issued.

15 Claims, 19 Drawing Sheets

| Pin No. | Signal |
|---|---|
| Pin 1 | Card detection / data 3 (DAT3) |
| Pin 2 | Command (CMD) |
| Pin 3 | Vss |
| Pin 4 | Vdd |
| Pin 5 | Clock (CLK) |
| Pin 6 | Vss |
| Pin 7 | Data 0 (DAT0) |
| Pin 8 | Data 1 (DAT1) |
| Pin 9 | Data 2 (DAT2) |

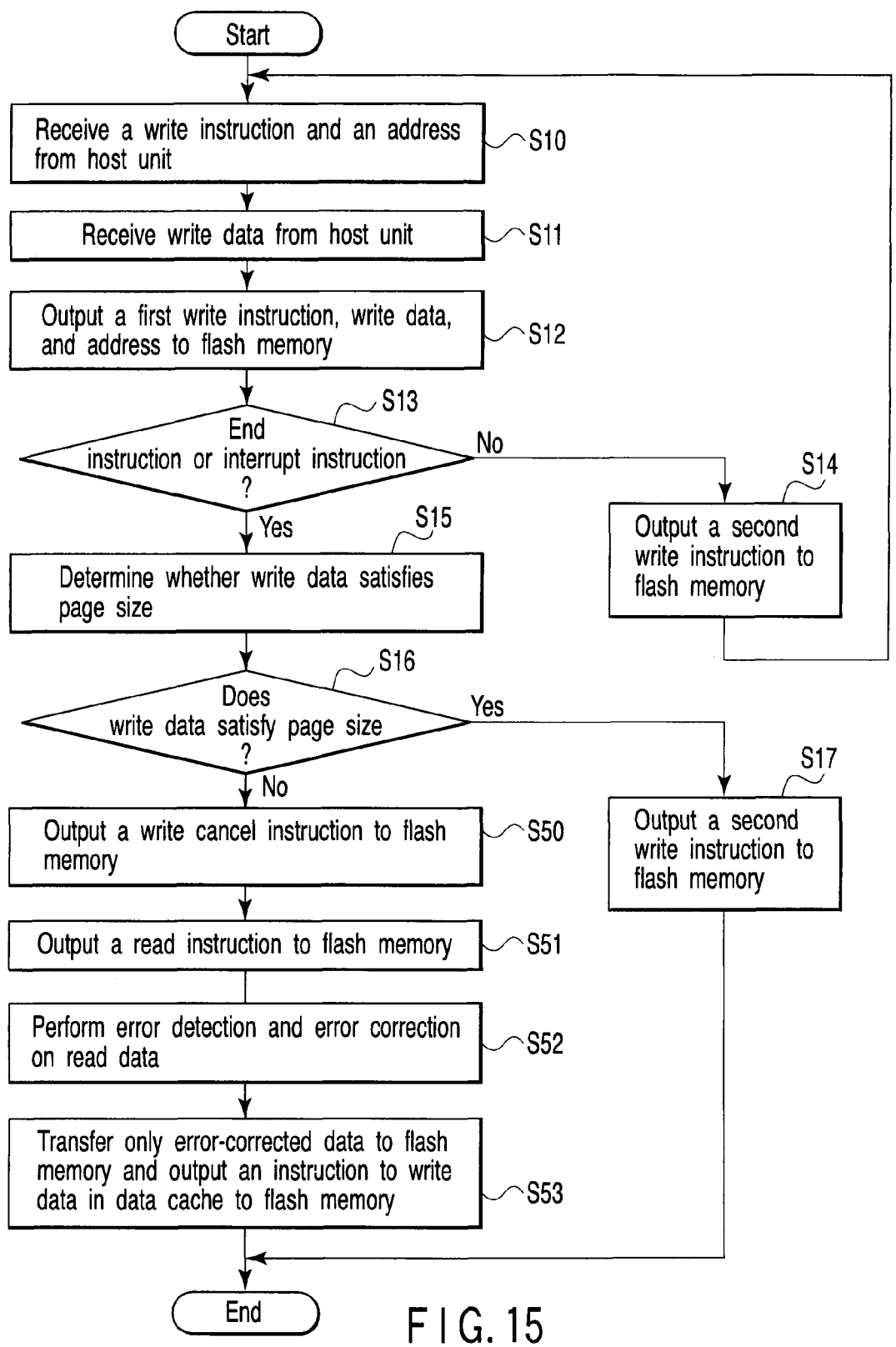
F I G. 15

US 7,937,523 B2

MEMORY SYSTEM WITH NONVOLATILE SEMICONDUCTOR MEMORY

CROSS-REFERENCE TO RELATED APPLICATIONS

This application is based upon and claims the benefit of priority from prior Japanese Patent Application No. 2006-182631, filed Jun. 30, 2006, the entire contents of which are incorporated herein by reference.

BACKGROUND OF THE INVENTION

1. Field of the Invention

This invention relates to a memory system and a card controller. More particularly, this invention relates to a memory system which includes a nonvolatile semiconductor memory and a card controller for controlling the operation of the nonvolatile semiconductor memory.

2. Description of the Related Art

In a NAND flash memory, data is written into a plurality of memory cells simultaneously. A unit for simultaneous writing is called a page. With the recent trend of NAND flash memories toward higher capacity, the page size is getting larger.

However, a host unit does not necessarily provide access in pages. For example, in a write operation, the end position of write data may not be at the page boundary. Moreover, chances are high the host unit will provide write access again using consecutive addresses. The reason is that the host unit cannot send a large quantity of data at a time to a flash memory and therefore divides the data into pieces and writes them a plurality of times.

In a conventional NAND flash memory, the same page is generally allowed to be written into unless overwriting whereby the same column is written into twice is done. Therefore, in such a case, no problem occurs.

In recent years, however, memory cells have been miniaturized further and designed to have a multilevel configuration. With this trend, writing data into the same page a plurality of times becomes a problem in terms of reliability. Thus, NAND flash memories prevented from performing such an operation have been increasing.

Predicting access from the above-described host unit, a control system for a NAND flash memory, when consecutive write accesses end at a place which is not the end position of a page, writes the data on the page into another memory block. A memory block is a set of memory cells and serves as a unit for erasing data. In this connection, there is a known technique where a page size of data is stored in a buffer when a write end address has not been given in advance by the host unit or when the transfer of data from the host unit has been interrupted for some reason. Such a technique has been disclosed in, for example, Jpn. Pat. Appln. KOKAI Publication No. 2006-092169. In the method, when the data size has finally failed to reach the page size, the data is written into another memory block.

However, the method has the problem of being unable to write data until the data size is eventually determined and therefore causing loss of time.

BRIEF SUMMARY OF THE INVENTION

A memory system according to an aspect of the present invention includes:

a nonvolatile semiconductor memory which has a plurality memory blocks each including memory cells capable of holding data, the data in each of the memory blocks being erased simultaneously, and the data being written simultaneously in pages in each of the memory blocks, each of the pages being a set of a plurality of memory cells; and a controller which transfers write data and a first row address to the nonvolatile semiconductor memory and issues a change instruction for the transferred first row address and a second row address differing from the first row address, the nonvolatile semiconductor memory writing the write data into the memory cells corresponding to the first row address when the change instruction has not been issued, and writing the write data into the memory cells corresponding to the second row address when the change instruction has been issued.

A card controller for controlling a nonvolatile semiconductor memory according to an aspect of the present invention includes:

a host interface which is configured to be connectable to a host unit and receives write data and a first row address from the host unit; and an arithmetic processing unit which transfers the write data to the nonvolatile semiconductor memory having a plurality of memory blocks each including memory cells capable of holding data and issues a change instruction for the first row address and a second row address differing from the first row address, the data in each of the memory blocks being erased simultaneously, the write data being written simultaneously in pages in each of the memory blocks, each of the pages being a set of a plurality of memory cells in each of the memory blocks, and the arithmetic processing unit, according to the change instruction, instructing the nonvolatile semiconductor memory to write the write data into the memory cells corresponding to the second row address.

BRIEF DESCRIPTION OF THE SEVERAL VIEWS OF THE DRAWING

FIG. 15 is a flowchart to help explain the processing in a card controller in a data aggregating method for a flash memory according to a third embodiment of the invention;

DETAILED DESCRIPTION OF THE INVENTION

First Embodiment

Figures 1, 2:
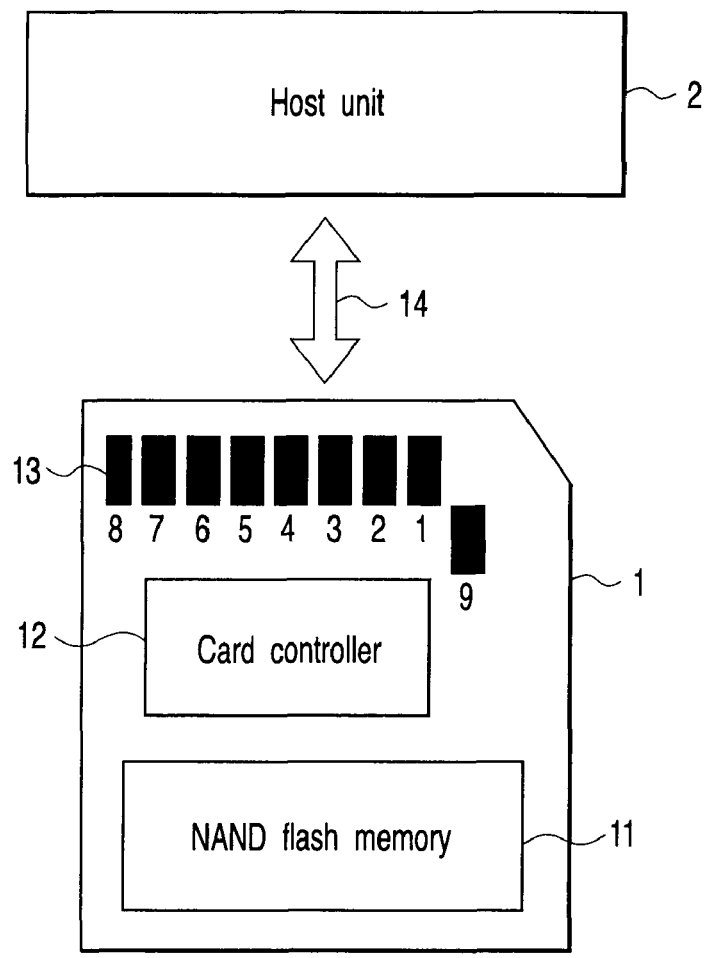
FIG. 1 is a block diagram of a memory system according to a first embodiment of the invention.
FIG. 2 is a table showing the allocation of signals to the signal pins of a memory card according to the first embodiment.

A memory system according to a first embodiment of the invention will be explained using FIG. 1. FIG. 1 is a block diagram of a memory system according to the first embodiment.

As shown in FIG. 1, the memory system includes a memory card 1 and a host unit 2. The host unit 2 includes hardware and software for accessing the memory card 1 to which the host unit is connected via a bus interface 14. The memory card 1 is supplied with power when being connected to the host unit 2 and carries out a process according to the access from the host unit 2.

The memory card 1 exchanges information with the host unit 2 via the bus interface 14. The memory card 1 includes a NAND flash memory chip (sometimes simply referred to as a NAND flash memory or a flash memory) 11, a card controller 12 for controlling the flash memory chip 11, and a plurality of signal pins (a first pin to a ninth pin) 13.

The plurality of signal pins 13 are electrically connected to the card controller 12. Signals are allocated to a first to a ninth pin of the plurality of signal pins 13 as shown in, for example, FIG. 2. FIG. 2 is a table showing the first to ninth pins and signals allocated to the pins.

Data 0 to data 3 are allocated to a seventh pin, an eighth pin, a ninth pin, and a first pin, respectively. The first pin is also allocated to a card detection signal. The second pin is allocated to a command, the third and sixth pins are allocated to the ground potential Vss, the fourth pin is allocated to a power supply potential Vdd, and the fifth pin is allocated to a clock signal.

The memory card 1 is so designed that it can be inserted into and removed from a slot made in the host unit 2. A host controller (not shown) provided in the host unit 2 exchanges various signals and data with the card controller 12 in the memory card 1 via the first to ninth pins. For example, when data is written into the memory card 1, the host controller sends a write command to the card controller 12 via the second pin in the form of a serial signal. At this time, in response to the clock signal supplied to the fifth pin, the card controller 12 takes in the write command supplied to the second pin.

As described above, the write command is input serially to the card controller 12 using only the second pin. As shown in FIG. 2, the second pin allocated to the input of a command is provided between the first pin for data 3 and the third pin for ground potential Vss. A plurality of signal pins 13 and a bus interface 14 for the signal pins 13 are used for the communication between the host controller in the host unit 2 and the memory card 1.

In contrast, the communication between the flash memory 11 and the card controller 12 is performed by an interface for NAND flash memory. Thus, although not shown here, the flash memory 11 and the card controller 12 are connected to each other with, for example, 8-bit input/output (I/O) lines.

For example, when the card controller 12 writes data into the flash memory 11, the card controller 12 inputs data input command 80H, a column address, a page address, data, and program command 10H to the flash memory 11 sequentially via the I/O lines. Here, "H" in command 80H represents hexadecimal number. Actually, an 8-bit signal of "10000000" is supplied in parallel to the 8-bit I/O lines. That is, in the NAND flash memory interface, a plurality of bits in a command are supplied in parallel.

Moreover, in the NAND flash memory interface, the command and data for the flash memory 11 are transmitted using the same I/O lines. As described above, the interface used for the communication between the host controller and memory card 1 in the host unit 2 differs from the interface used for the communication between the flash memory 11 and card controller 12.

Figure 3:
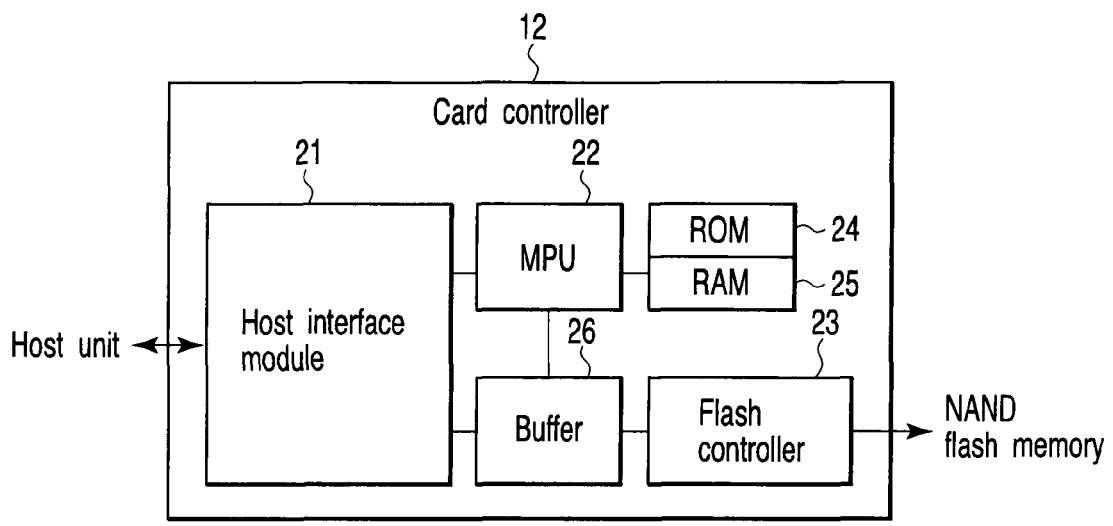
FIG. 3 is a block diagram of a card controller included in the memory card of the first embodiment.

Next, the internal configuration of the card controller included in the memory card 1 of FIG. 1 will be explained using FIG. 3. FIG. 3 is a block diagram of the card controller 12.

The card controller 12 manages the physical state of the flash memory 11 (for example, at what physical block address what number logical sector address data is included or which block is in the erased state). The card controller 12 includes a host interface module 21, a microprocessor unit (MPU) 22, a flash controller 23, a read-only memory (ROM) 24, a random access memory (RAM) 25, and a buffer 26.

The host interface module 21 executes an interfacing process between the card controller 12 and the host apparatus 2.

The MPU 22 controls the operation of the overall memory card 1. For example, when the memory card 1 is supplied with power, the MPU 22 reads the firmware (control program) stored in the ROM 24 into the RAM 25 and carries out a specific process, thereby creating various tables on the RAM 25. Moreover, the MPU 22 receives a write command, a read command, or an erase command from the host unit 2 and then performs a specific process on the flash memory 11 or controls a data transfer process via the buffer 26.

The ROM 24 stores a control program or the like controlled by the MPU 22. The RAM 25 is used as a work area of the MPU 22 and stores the control program and various tables. The flash controller 23 executes an interfacing process between the card controller 12 and the flash memory 11.

The buffer 26 stores a specific amount of data (e.g., a page of data) temporarily when the data sent from the host unit 2 is written into the flash memory 11 or when the data read from the flash memory 11 is sent to the host unit 2.

Figure 4:
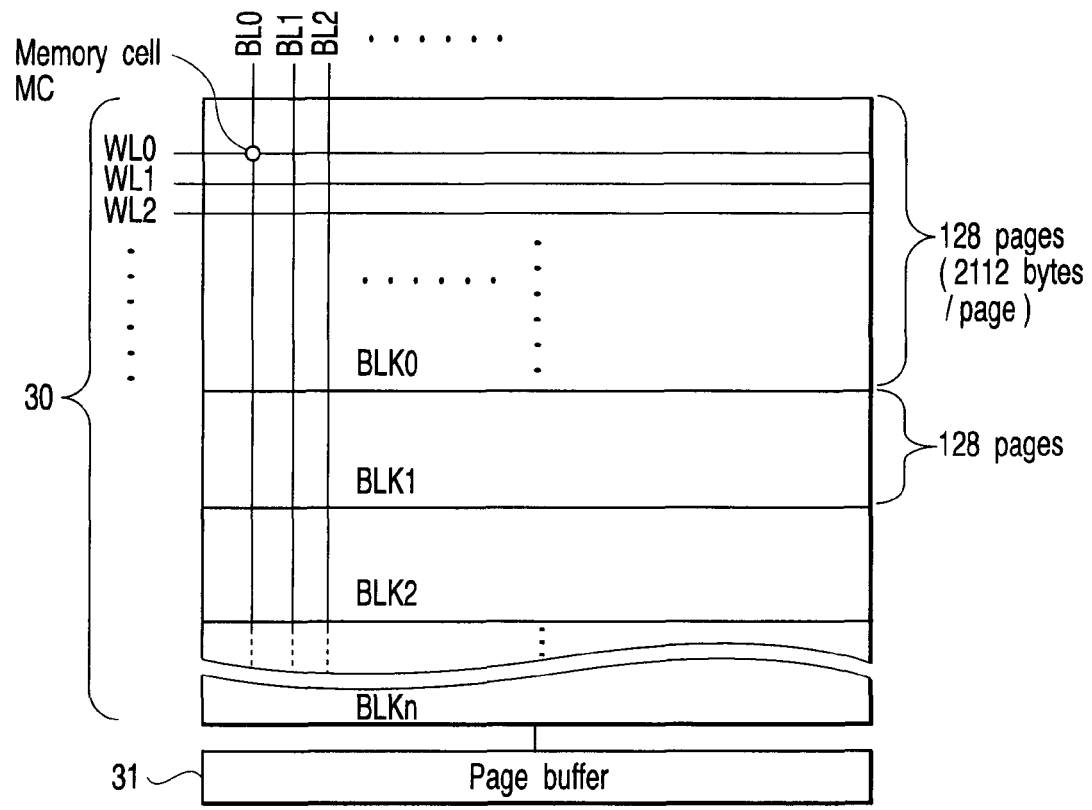
FIG. 4 is a block diagram of a flash memory according to the first embodiment.

Next, the internal configuration of the NAND flash memory 11 will be explained briefly. FIG. 4 is a block diagram of the NAND flash memory 11. As shown in FIG. 4, the NAND flash memory 11 includes a memory cell array 30 and a page buffer 31.

The memory cell array 30 includes a plurality of memory cell blocks BLK0 to BLKn (n is a natural number equal to or larger than 2). Hereinafter, the memory cell blocks BLK0 to BLKn may be simply referred to as the memory blocks BLK. Data is erased in memory blocks BLK. That is, the data in the same memory cell block BLK is erased simultaneously. Each of the memory cell blocks BLK includes a plurality of memory cells MC. Each memory cell is a MOS transistor having a stacked gate including a charge accumulation layer (for example, a floating gate in the embodiment) and a control gate. In a memory cell block BLK, a plurality of word lines WL0, WL1, . . . (hereinafter, referred to as word lines WL) and bit lines BL0, BL1, . . . (hereinafter, referred to as bit lines BL) perpendicular to the word lines WL are provided. The memory cells in the same row are connected equally to the same word line. The memory cells MC in the same column are connected equally to a bit line BL in units of a plurality of memory cells. Data is written and read in units of a set of a plurality of memory cells. A set of memory cells is called one page. In a read operation and a write operation, a word line WL is selected according to a row address and a bit line BL is selected according to a column address. In the example of FIG. 4, each page of the flash memory 11 has 2112 bytes (a 512-byte data storage section×4+a 10-byte redundant section×4+a 24-byte management data storage section). Each memory block BLK includes, for example, 128 pages.

The page buffer 31, which inputs and outputs data to and from the flash memory 11, holds the data temporarily. The data size the page buffer 31 can hold is 2112 bytes (2048 bytes+64 bytes), which is the same as the page size of each memory block BLK. When data is written, the page buffer 11 inputs and outputs data to and from the flash memory 11 in units of one page corresponding to its own memory capacity. Hereinafter, to simplify the explanation, the redundant section and the management data storage section are omitted and the data size of one page is assumed to be 2048 bytes.

Figure 5:
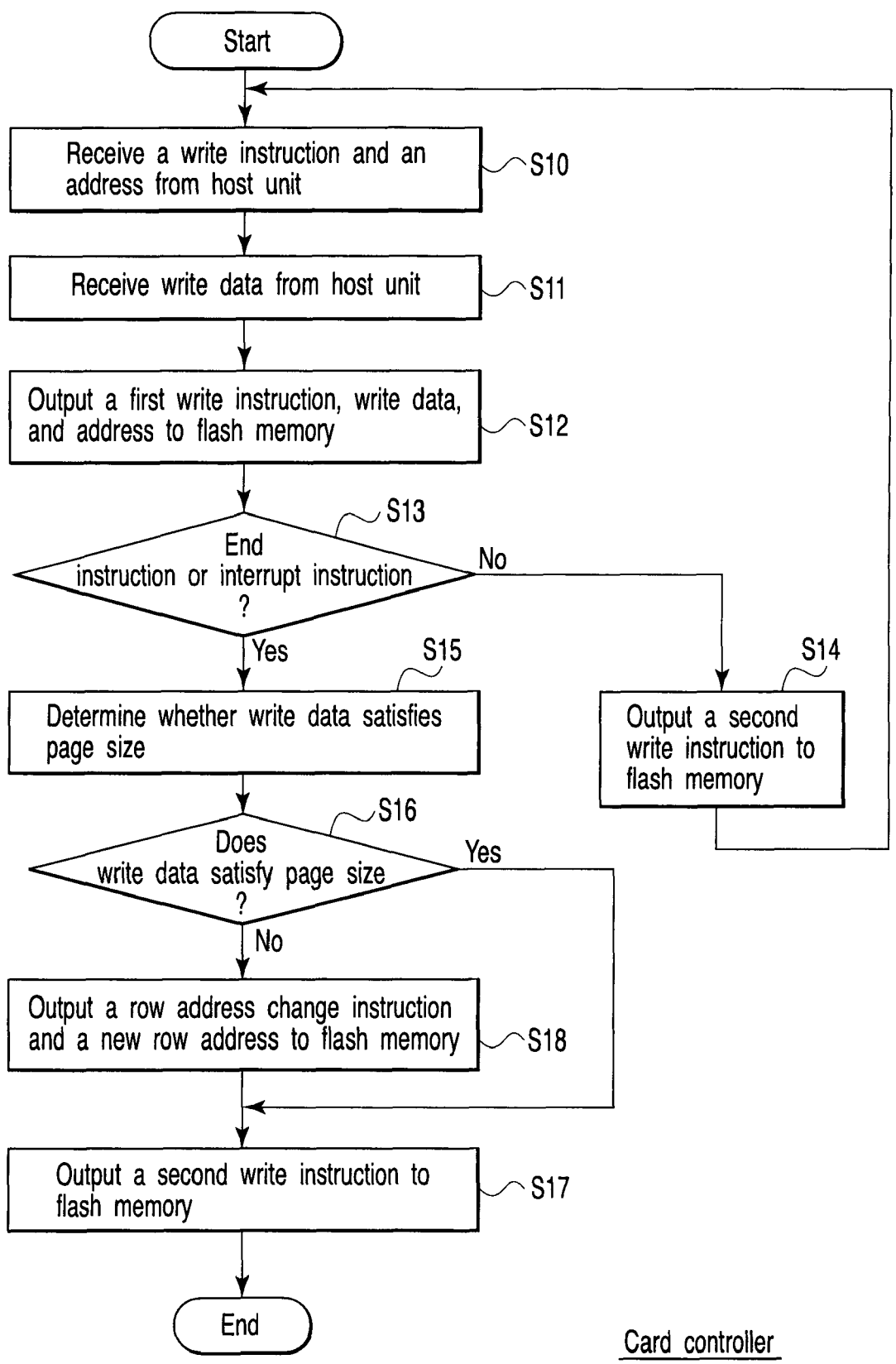
FIG. 5 is a flowchart to help explain the processing in the card controller in a data writing method for the flash memory of the first embodiment.

Next, a data writing method in the memory system with the above configuration will be explained. First, a process carried out mainly by the card controller 12 will be explained using FIG. 5. FIG. 5 is a flowchart to help explain the processing in the card controller 12.

As shown in FIG. 5, first, the card controller 12 receives from the host unit 2 a data write instruction and an address in which data is to be written in the NAND flash memory 11 (step S10). Then, the card controller 12 receives write data from the host unit 2 (step S11). The card controller 12 then outputs a first write instruction, the write data, and the address to the flash memory 11. Receiving the first write instruction, the flash memory 11 recognizes the start of a write operation. Here, it is when a second write operation described later is given that data is actually written into the memory cells MC.

Next, the MCU 22 of the card controller 12 determines whether a write access end or interrupt instruction has been received from the host unit 2 (step S13). If none of them have been received (No in step S13), the MCU 22 outputs a second write instruction to the flash memory 11 (step S14). In step S14, the flash memory 11 waits for a continued input write data, the second write instruction or the reset instruction from the card controller 12.

If either the end instruction or interrupt instruction has been given in step S13 (Yes in step S13), the MCU 22 determines whether the write data transferred to the flash memory 11 satisfies the page size in the flash memory 11 (step S15). That is, the MCU 22 determines whether the data size of the write data is equal to or less than 2048 bytes. If the condition is satisfied, that is, if the data size is 2048 bytes (Yes in step S16), the MCU 22 outputs the second write instruction to the flash memory 11 (step S17). If the condition is not fulfilled, that is, if the data size is less than 2048 bytes (No in step S16), the MCU 22 issues a row address change instruction and a new row address and outputs them to the flash memory 11 (step S18) and then carries out the process of step S17.

Figure 6:
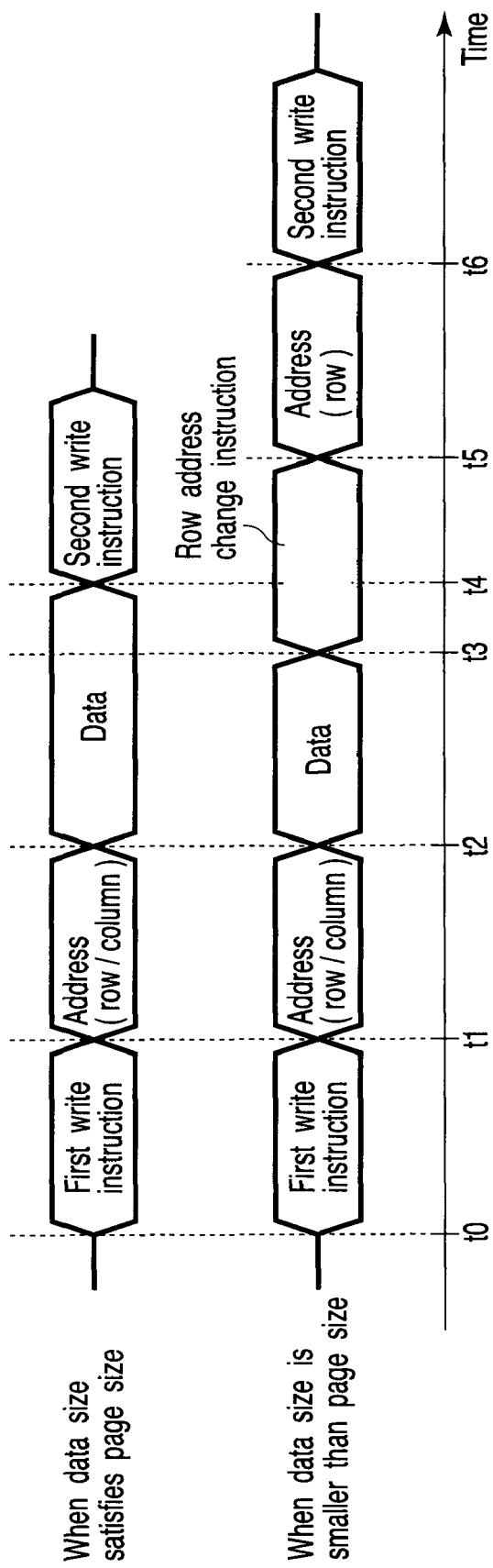
FIG. 6 is a timing chart for the signals output by the card controller of the flash memory according to the first embodiment.

The signals given from the card controller 12 to the flash memory 11 in the above processes will be explained using FIG. 6. FIG. 6 is a timing chart for the signals output from the card controller 12 to the flash memory 11. In the upper part of FIG. 6, the signals output when there is neither an end instruction nor an interrupt instruction (No in step S13) or when the write data has satisfied the page size (Yes in step S16) are shown. In the lower part of the FIG. 6, the signals output when the write data has not satisfied the page size (No in step S16) are shown.

As shown in FIG. 6, in each case, first, at time t0, a first write instruction is output. Thereafter, addresses (row address and column address) and the write data are output at time t1 and time t2 in sequence, respectively. Then, when there is neither an end instruction nor an interrupt instruction, or when the write data has satisfied the page size, a second write instruction is output at time t4, which completes the flow of a series of signals. When the write data has not satisfied the page size, the transfer of data ends at time t3 earlier than time t4, since the amount of data is less than when the page size has been satisfied. Then, following the write data, a row address change instruction is output at time t3 and a new row address is output at time t5. Thereafter, a second write instruction is output at time t6. In the latter case, an effective row address is not the row address output at time t1 but a new row address output at time t5. The new row address is an address corresponding to a memory block BLK differing from the memory block BLK to which the first row address corresponds.

Figure 7:
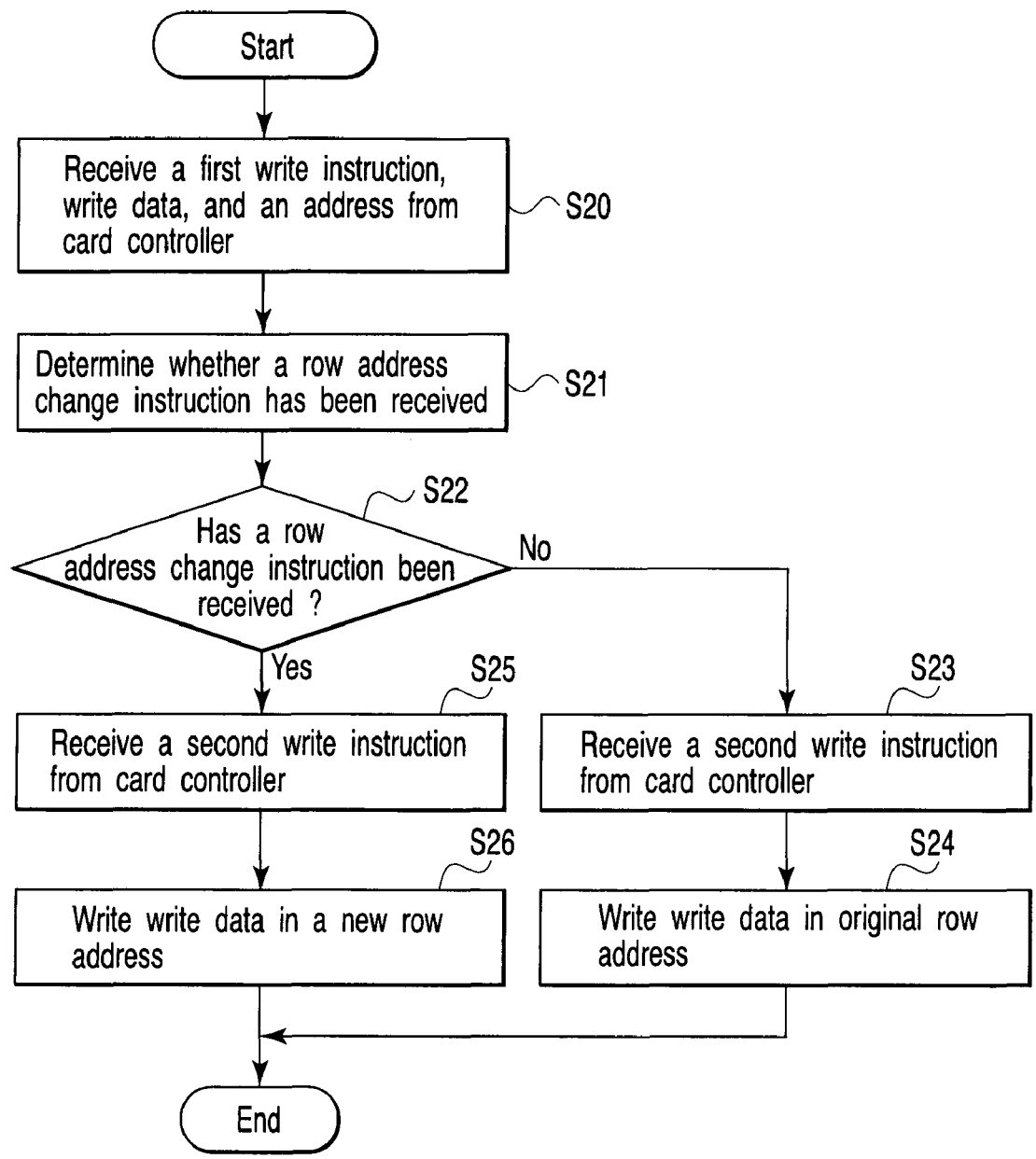
FIG. 7 is a flowchart to help explain the processing in a NAND flash memory in a data writing method for the flash memory of the first embodiment.

Next, a process carried out mainly by the NAND flash memory 11 will be explained using FIG. 7. FIG. 7 is a flowchart to help explain the processing in the flash memory 11. As shown in FIG. 7, first, the flash memory 11 receives a first write instruction, write data, and an address from the card controller 12 (step S20). Then, the flash memory 11 determines whether it has received a row address change instruction and a new row address (step S21). If the flash memory 11 has received neither a row address change instruction nor a new row address (No in step S22), it receives a second write instruction from the card controller 12 (step S23) and then writes data into the memory cell MC specified by the row address and column address received in step S20 (step S24). If the flash memory has received a row address change instruction (Yes in step S22), it receives a second write instruction (step S25) and then writes data into the memory cell MC specified by the column address received in step S20 and a new row address received after the row address change instruction (step S26).

Figure 8:
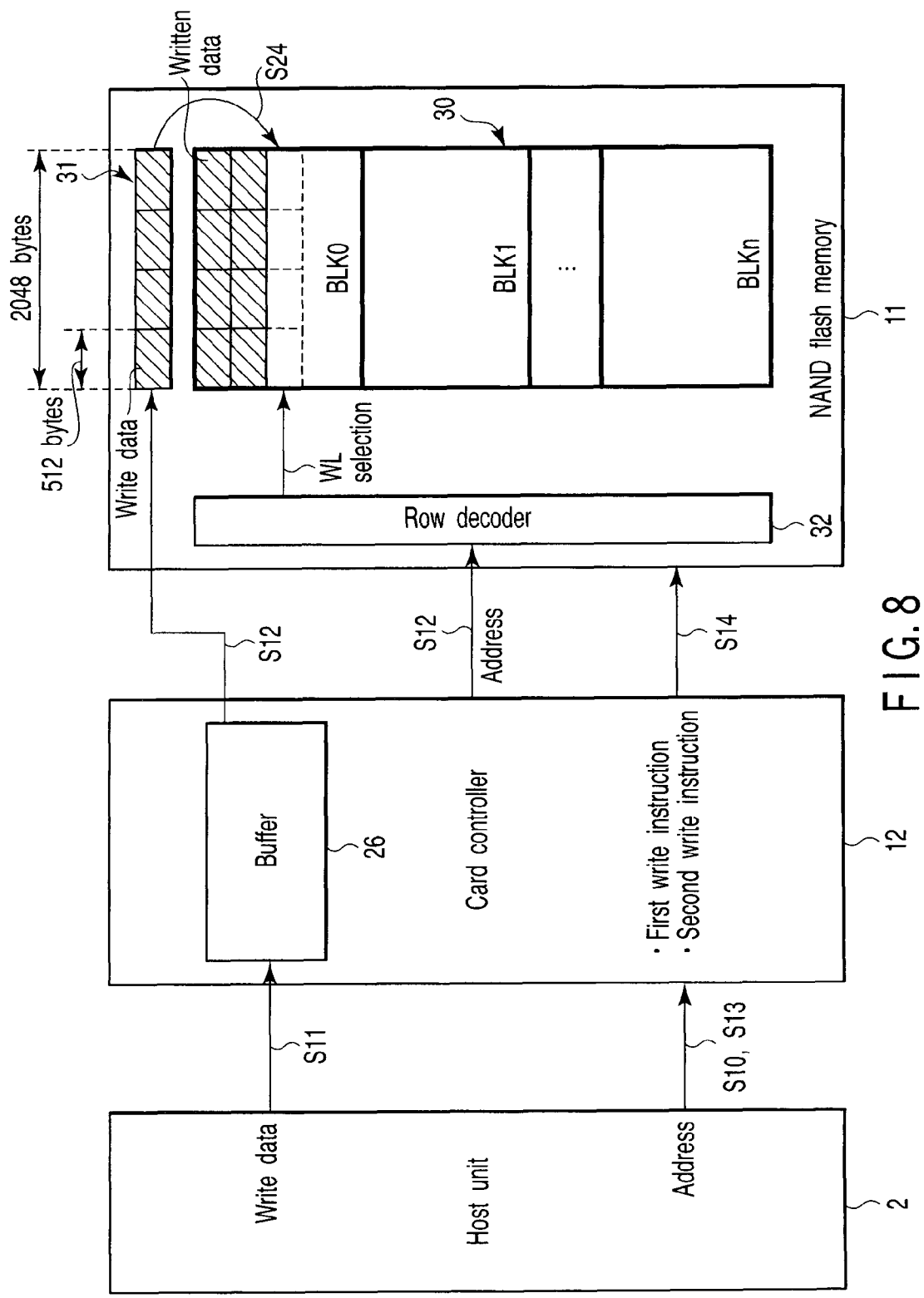
FIGS. 8 and 9 are block diagrams of a memory system according to the first embodiment, showing the way data is written.
Figure 9:
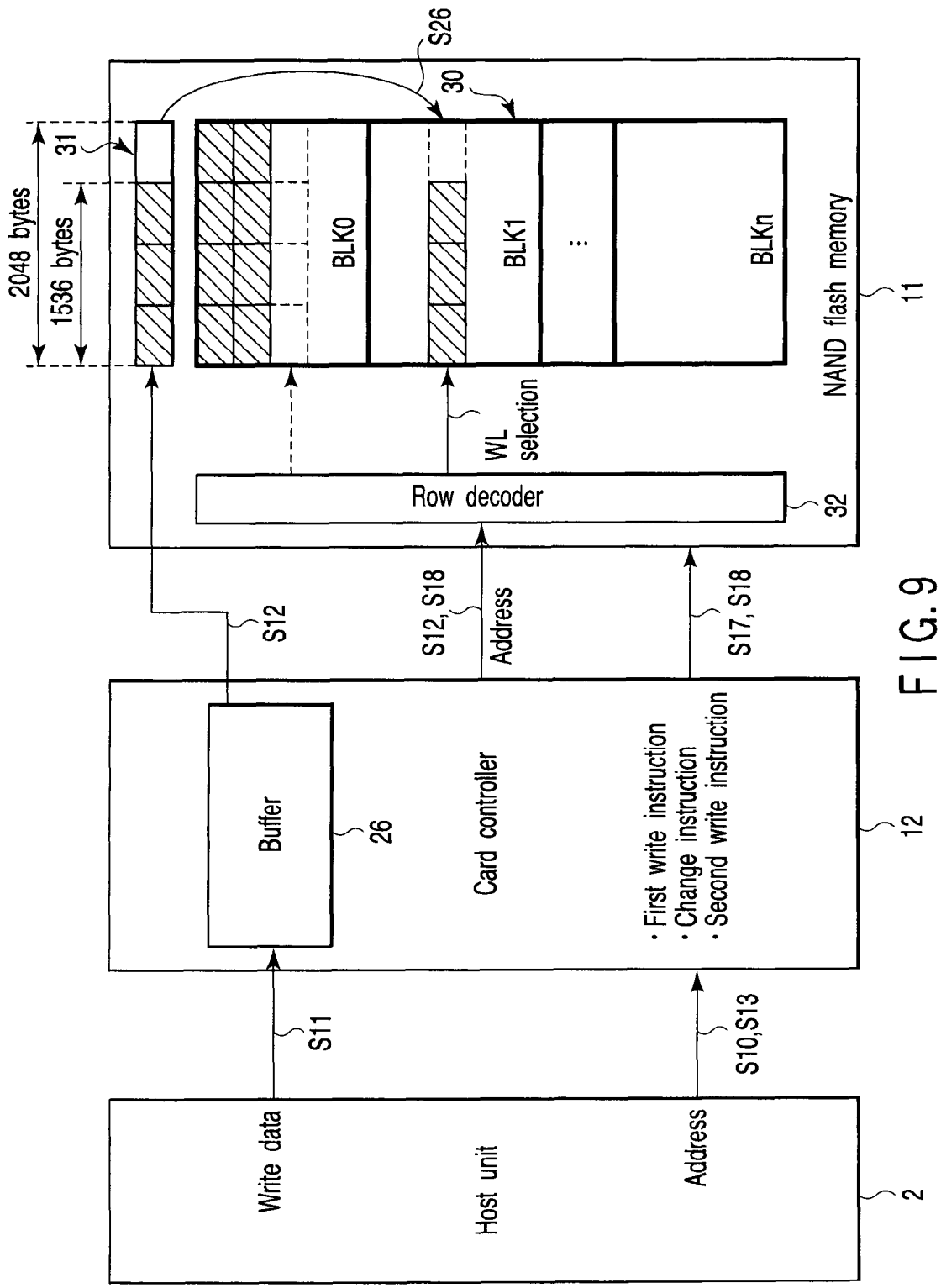

The way the write operation is carried out will be explained using FIGS. 8 and 9. FIGS. 8 and 9 are block diagrams of a memory system. FIG. 8 shows a case where there is neither an end instruction nor an interrupt instruction (No in step S13) or where the write data has satisfied the page size (Yes in step S16). FIG. 9 shows a case where the write data has not satisfied the page size (No in step S16). Both FIG. 8 and FIG. 9 show a case where the page size of one page is 2048 bytes and the card controller 112 transfers data in units of 512 bytes to the flash memory 11. In FIGS. 8 and 9, the shaded areas show write data.

First, FIG. 8 will be explained. As shown in FIG. 8, write data supplied from the host unit 2 is stored in the buffer 26 of the card controller 12. Moreover, an address is given to the card controller 12. Then, the card controller 12 transfers the write data in the buffer 26 to the page buffer 31. FIG. 8 shows the way four items of data each having a data size of 512 bytes, that is, 2048 bytes of write data, are transferred to the page buffer 31. In step S12, the card controller 12 transfers a row address to the row decoder 32 in the flash memory 11. On the basis of the row address given in step S12, the row decoder 32 selects any one of the word lines WL. In FIG. 8, the word line WL in memory block BLK0 is selected. Then, in response to the second write instruction, the write data in the page buffer 31 is written into the memory cell MC connected to the selected word line WL.

Next, FIG. 9 will be explained. FIG. 9 shows the way data is transferred to the page buffer 31 in such a manner that four items of data each having a data size of 512 bytes, that is, 2048 bytes of write data, are written into each of two pages of memory block BLK0, and then three items of data each having a data size of 512 bytes, that is, 1536 bytes of write data, are written into consecutive addresses in memory block BLK0. Only what differs from FIG. 8 will be explained. It is assumed that the row address given to the flash memory 11 in step S12 corresponds to the word line WL in memory block BLK0. After determining that the data in the buffer 26 (or page buffer 31) is less than the page size (1536 bytes<2048 bytes), the MCU 22 of the card controller 12 outputs a row address change instruction to the flash memory 11 and further issues a new row address and outputs it to the row decoder 32. Suppose the new row address corresponds to the word line WL in memory block BLK1. Then, on the basis of the new row address, the row decoder 32 selects the word line WL in memory block BLK1, not in memory block BLK0. Then, in response to the second write instruction, 1536 bytes of write data in the page buffer 31 are written into the memory cell MC connected to the word line WL selected by the row decoder 32.

The memory system with the above configuration produces the following effect.

(1) Data write speed can be improved.

With the memory system of the first embodiment, when the data in the page buffer 31 falls short of the page size, the data is written into a memory block BLK differing from the memory block BLK into which the data has been written so far. That is, there is no need to wait for a write operation until the data in the page buffer has reached the page size. Accordingly, the write speed can be improved. In the method according to the embodiment using the row address change instruction, since the data with a page size is not required to be stored in the buffer of the card controller 12, the controller can transmit the data to the NAND flash memory without delay, therefore the data write speed can be improved compared to the method that the reset instruction is issued and data is re-input to inhibit writing data and change the row address, and data write is carried out in wait for storing the data with the page size in the buffer of the controller.

Furthermore, with the memory system of the first embodiment, the card controller 12 issues a row address change instruction and a new row address. When receiving the row address change instruction, the flash memory 11 selects the row direction of the memory cell array 30 on the basis of the new row address. Then, the data transferred to the page buffer 31 can be written into a different memory block BLK at high speed.

In this respect, when the card controller 12 has no row address change instruction, if an attempt is made to write the data in the page buffer 31 into a different memory block BLK, the card controller has to transfer the data again to the page buffer. Specifically, when the row address is changed, the card controller outputs a reset instruction to cancel the write instruction. Next, the card controller issues a first write instruction to specify a new row address. Then, the card controller inputs data to the page buffer again. Finally, the card controller issues a second write operation. As described above, the retransfer of data to the page buffer is needed, which leads to loss of time. With the first embodiment, however, since the retransfer of data is not needed, the data write speed can be improved.

Second Embodiment

Figure 10:
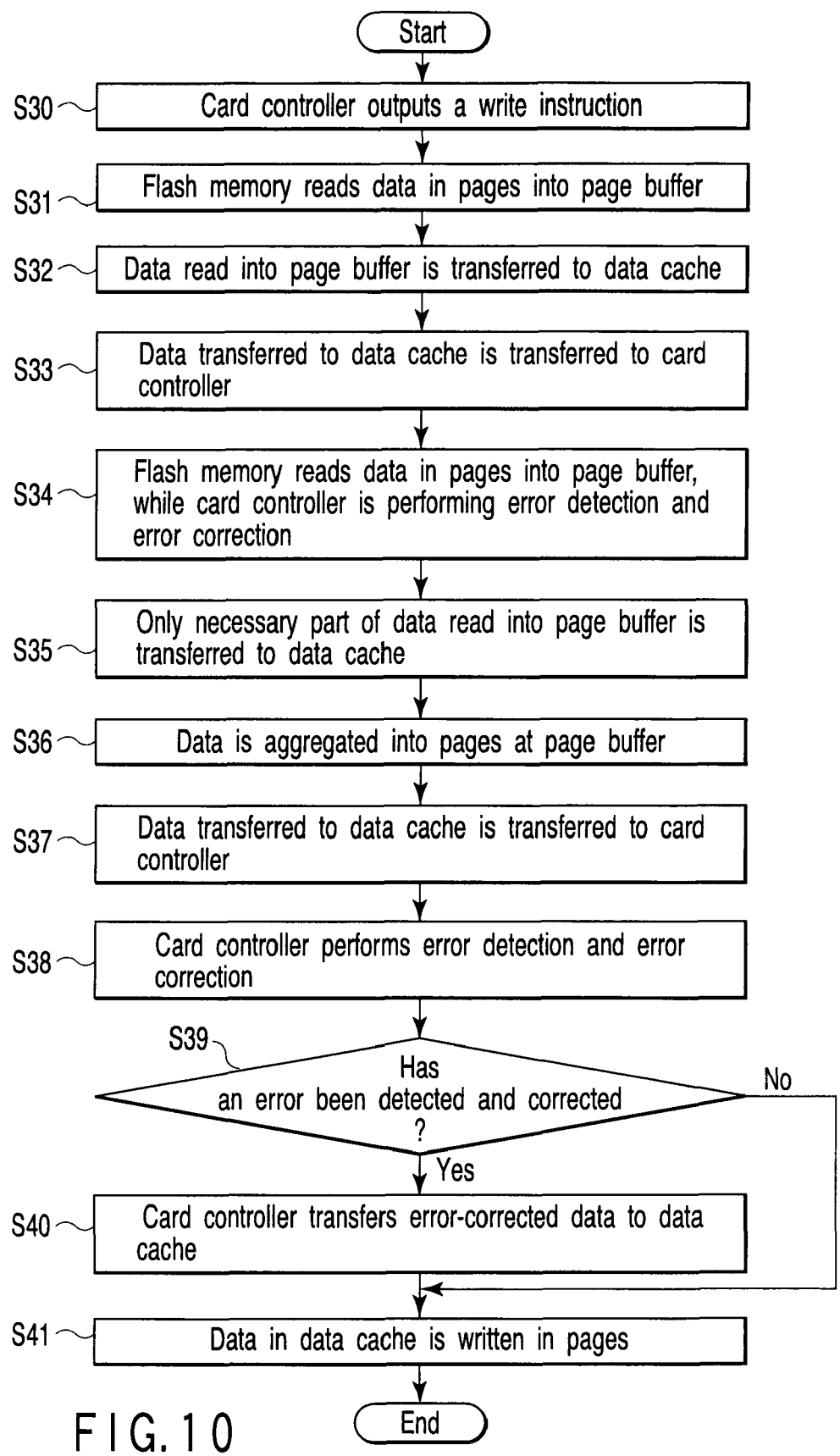
FIG. 10 is a flowchart to help explain a data writing method for a flash memory according to a second embodiment of the invention.

Next, a memory system according to a second embodiment of the invention will be explained. The second embodiment relates to a method of aggregating a plurality of data items each having a data size of less than one page into one page (hereinafter, referred to as data aggregation) with the configuration of the first embodiment. FIG. 10 is a flowchart to help explain a data aggregating method in a memory system according to the second embodiment. A NAND flash memory of the second embodiment is such that the configuration shown in FIGS. 8 and 9 explained in the first embodiment further includes a data cache. The data cache holds data in pages temporarily as the page buffer does.

As shown in FIG. 10, first, the MCU 22 of the card controller 12 outputs a read instruction to the flash memory 11 (step S30). The read instruction may be a read instruction as a part of a data aggregate instruction, not just an ordinary data read instruction. The card controller 12 gives an address together with the read instruction to the flash memory 11. Next, the flash memory 11 selects a page corresponding to the address given in step S30 and reads data in pages into the data buffer (step S31). Thereafter, the data read into the page buffer is transferred to the data cache (step S32). Then, the data transferred to the data cache is transferred to the buffer 26 of the card controller 12 (step S33).

Figure 11:
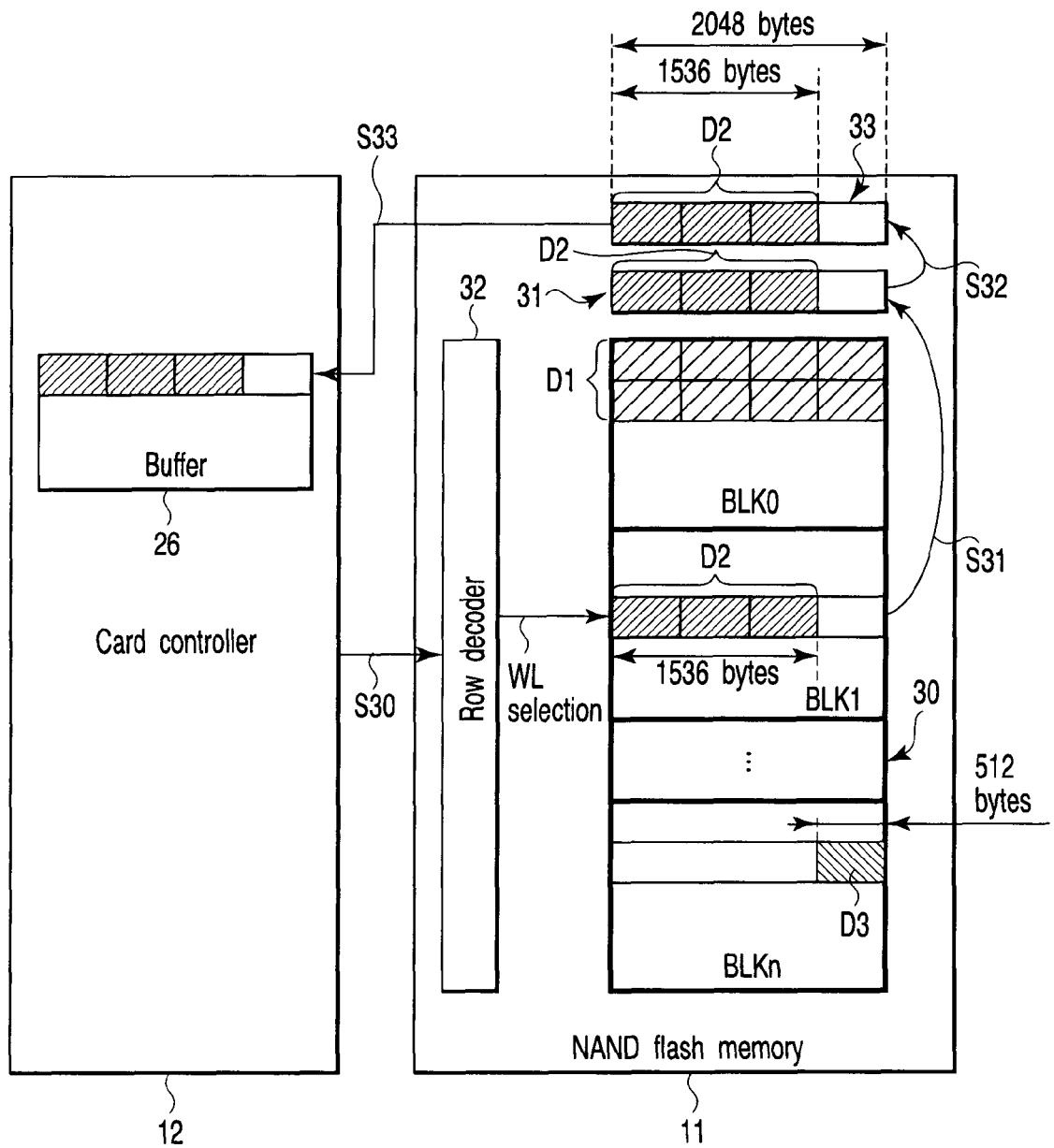
FIGS. 11 to 14 are block diagrams of a memory system according to the second embodiment, showing the way data is aggregated.

FIG. 11 is a diagram to help explain step S30 to step S33. FIG. 11 is a block diagram of the card controller 12 and flash memory 11. As shown in FIG. 11, memory block BLK0 holds data D1 whose data size corresponds to two pages, or is 4096 bytes. Memory block BLK1 holds data D2 whose data size is less than the page size, for example, 1536 bytes. Memory block BLKn holds data D3 whose data size is less than the page size, for example, 512 bytes. With this configuration, 1536-byte data D2 and 512-byte data D3 are aggregated into 2048 bytes of data, that is, one-page-size data, which is then written into memory block BLK0. This will be explained below.

As shown in FIG. 11, when receiving a read instruction from the card controller 12, the row decoder 32 selects a word line WL in, for example, memory block BLK1. As a result, the data on the page including data D2 is read in pages into the page buffer 31. Hereinafter, the data read in pages may be referred to page data. The page data read at this point in time includes not only 1536-byte data D2 but also 512 (=2048−1536) bytes of unnecessary data. Then, data D2 in the page data read into the data buffer 31 is transferred to the data cache 33 and further to the buffer 26.

To return to FIG. 10, the explanation is continued. After step S33, the MCU 22 of the card controller 12 checks data D2 transferred to the buffer 26 for an error. If having detected an error, the MCU 22 corrects the error. Moreover, while the card controller 12 is performing error detection and error correction, the flash memory 11 reads data differing from the data in step S31 in pages into the page buffer 31 (step S34).

Figure 12:
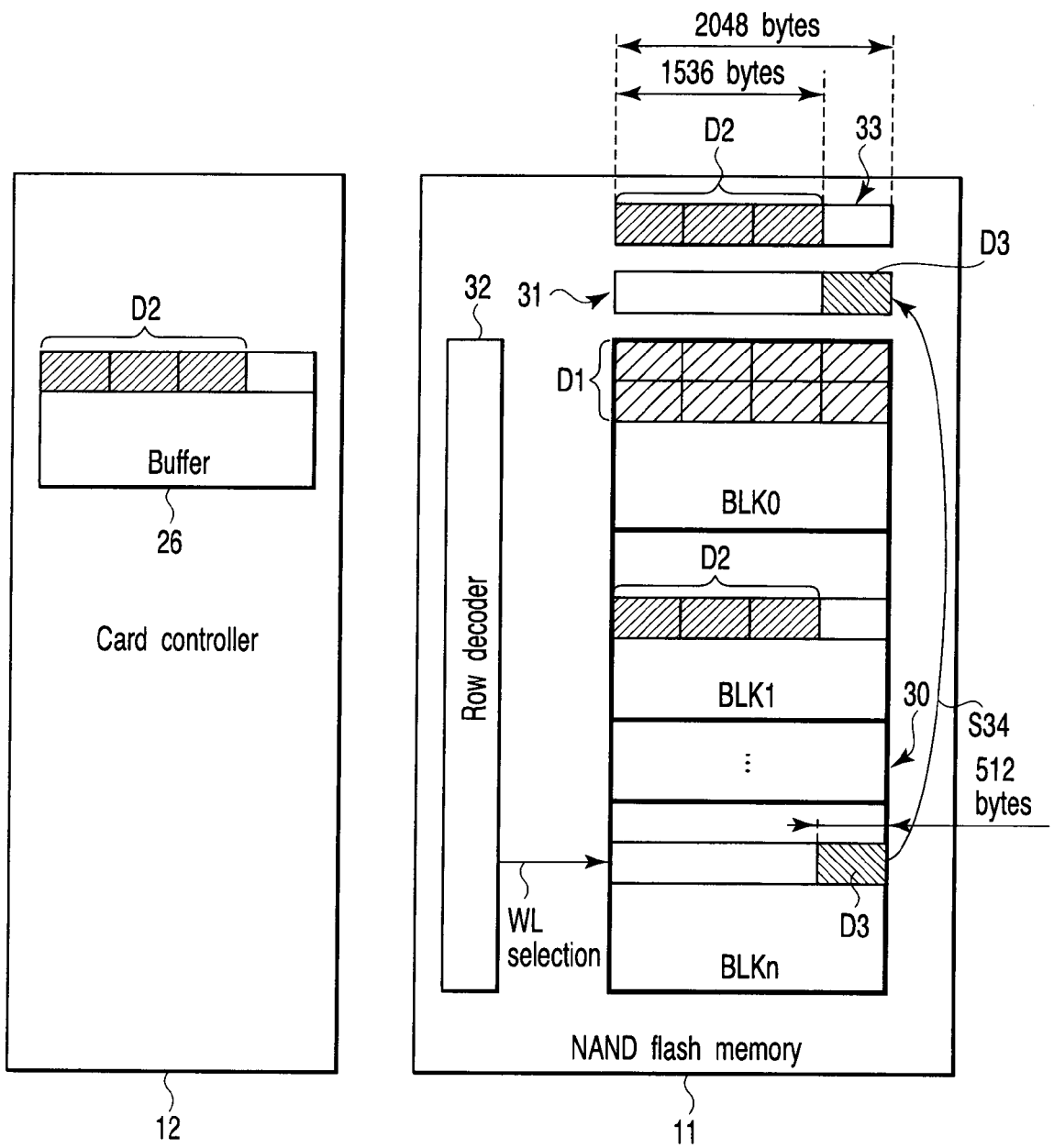

FIG. 12 is a diagram to help explain step S34. As shown in FIG. 12, the row decoder 32 selects any one of the word lines WL in, for example, memory block BLKn. As a result, the data on a page including 512-byte data D3 is read in pages into the page buffer 31. The row address corresponding to the word line WL selected in step S34 may be given in step S30 or at any point in time before the card controller 12 performs error detection and error correction. At this time, the card controller 12 determines which data item (here, data D3) should be read to aggregate the data item and data D2 into a data size of one page. Specifically, since the card controller 12 holds a table showing in which area what data has been stored, it selects appropriate data with reference to the table. While in the example of FIG. 12, data is read from memory block BLKn different from memory block BLK0, data may be read from another page in the same memory block BLK0.

To return to FIG. 10, the explanation is continued. After step S34, the flash memory transfers only the necessary data of the data read into the page buffer 31 in step S34 to the data cache 33 (step S35). At this time, the data cache 33 holds data falling short of the page size transferred in step S32. That is, the data cache 33 has a free area. In other words, since data is read in pages in step S32, not only necessary data but also unnecessary data on the same page as that of the necessary data are held in the data cache 33. Similarly, since in step S34, too, data is read in pages, unnecessary data is also read into the data buffer. To overcome this problem, in step S35, only the necessary data of the data read in pages in step S34 is transferred to the area in which unnecessary data has been held in the data cache 33. As a result, the data cache holds the data falling short of the page size read in step S32 and the data falling short of the page size read in step S34, which are aggregated to produce just the same data size as one page (step S36). That is, two data items are aggregated into a page size. Thereafter, the data transferred to the data cache 33 in step S35 is transferred to the buffer 26 of the memory controller 12 (step S37). Then, the MCU 22 performs error detection and error correction (step S38).

Figure 13:
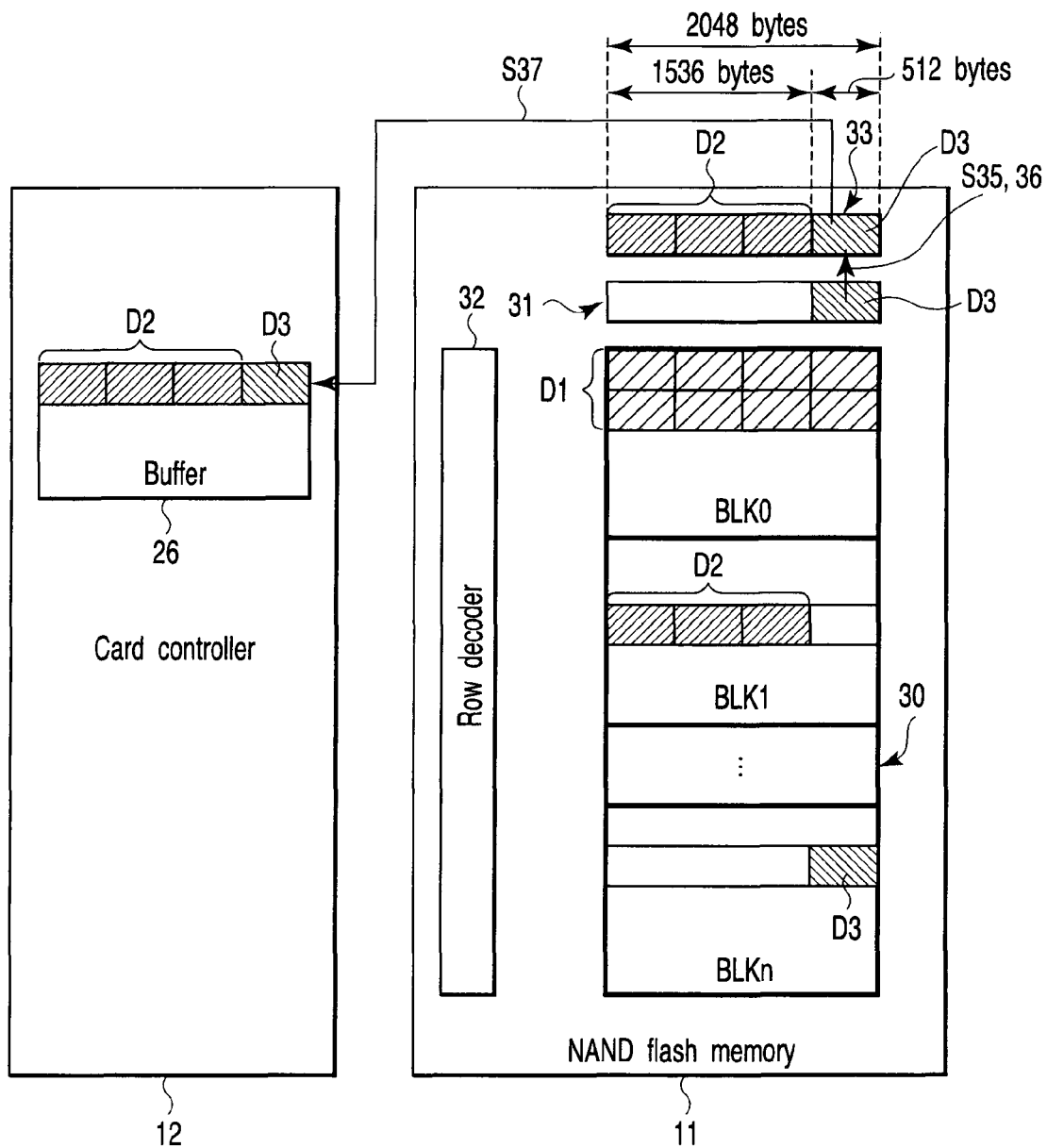

FIG. 13 is a diagram to help explain step S35 to step S38. As shown in FIG. 13, only the necessary data D3 of the page data including data D3 read into the data buffer 31 is transferred to the data cache 33. Since 1536-byte data D3 is held in the data cache 33, the cache 33 has the remaining 512-byte free area. Thus, 512-byte data D3 is transferred to the free area. As a result, the data cache 33 holds data D2 and data D3. The data size of an aggregate of data D2 and data D3 is 2048 bytes, just the data size of one page. Then, data D3 in the data cache 33 is transferred to the buffer 26.

To return to FIG. 10, the explanation is continued. After step S38, if the MCU 22 has detected an error in any data item and corrected the error (Yes in step S39), it transfers the corrected data to the data cache 33 (step S40). At this time, the MCU 22 transfers only the corrected data to the data cache 33, thereby replacing the uncorrected data. Then, the flash memory 11 writes the data held in the data cache 33 into the memory cell MC in pages (step S41).

Figure 14:
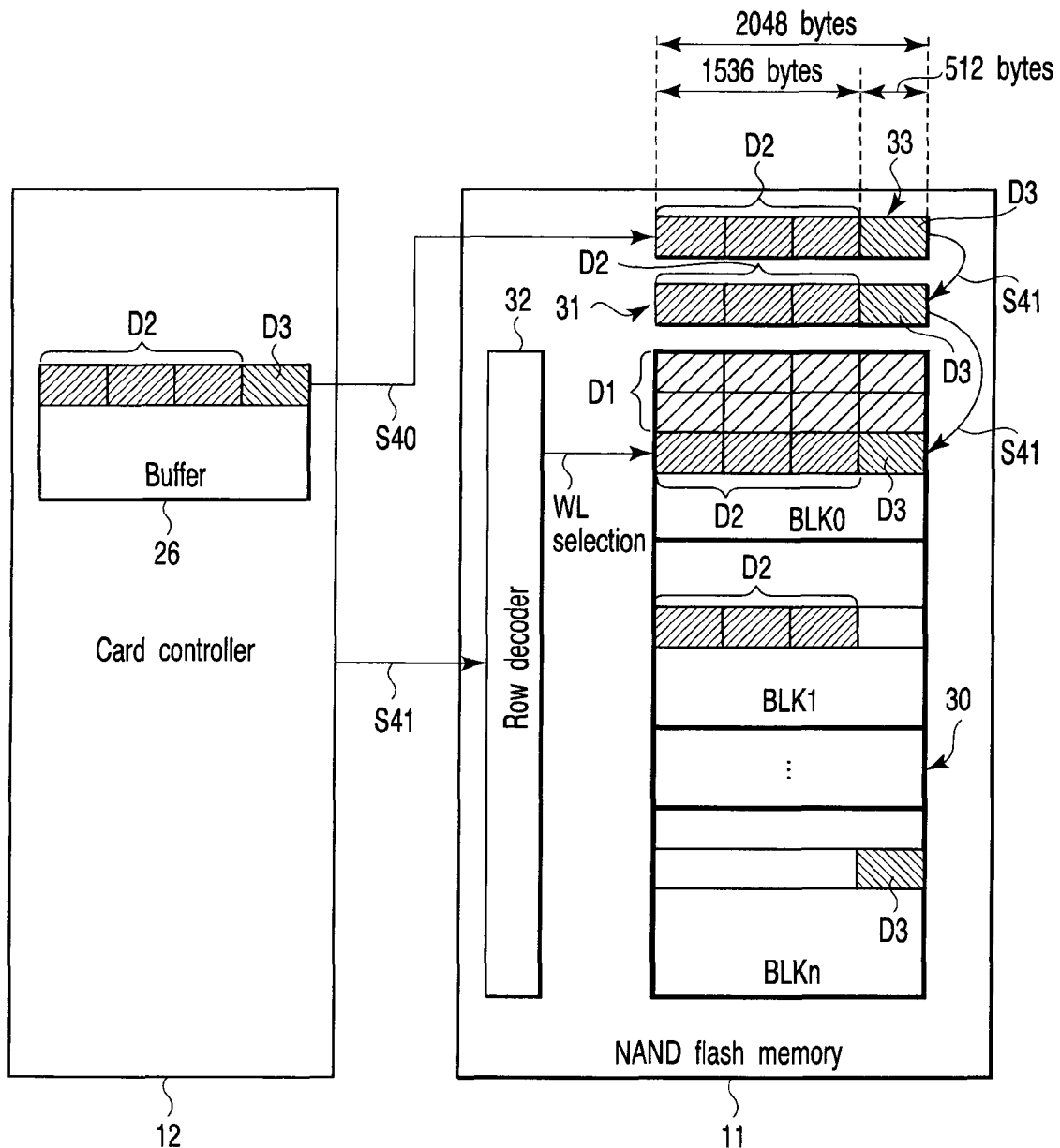

FIG. 14 is a diagram to help explain step S39 to step S41. As shown in FIG. 14, if the data has been corrected, the data in the data cache 33 is replaced with the corrected data. Then, the data in the data cache 33 (2048 bytes of data obtained by aggregating data D2 and data D3) is transferred to the data buffer 33 and further written into the memory cell array 30. Specifically, the row decoder 32 selects the word line WL corresponding to the address continuous with data D1 in memory block BLK0. This enables data D2 and data D3 to be written into the same page in memory block BLK0. The row address for the row decoder 32 to select a word line WL may be given from the card controller 12 to the row decoder 32 in step S41. Alternatively, the row address may be given in step S30 or step S40.

The memory system as described above produces the effect described in item (2) below.

(2) The aggregation of data falling short of the page size is made easier and faster.

With the memory system of the second embodiment, the page buffer 31 exchanges data with the data cache 33 in units smaller than page units. This enables the aggregation of data to be made easier and the data aggregating speed to be made faster.

Data exchange between the page buffer and the data cache was generally performed in page size units. In this method, however, the process of aggregating data falling short of the page size into a page had to be carried out at the buffer 26 in the card controller 26. Moreover, for example, when two data items read in two read operations were aggregated, the data cache held the data read later and could not hold the data read earlier. Therefore, regardless of whether there is an error in the read data, the aggregated data has to be transferred from the buffer 26 of the card controller 12 to the data cache 33. The transfer leads to loss of time in the aggregating process.

In the second embodiment, however, data exchange between the page buffer 31 and data cache 33 is carried out in units smaller than the page units. Accordingly, a plurality of data items can be aggregated into a page in the data cache 33. If there is an error in the data, only the corrected data has to be transferred from the buffer 26 to the data cache 33. However, if there is no error, the transfer is not needed. Consequently, the data aggregating process can be made easier and faster.

Third Embodiment

Next, a memory system according to a third embodiment of the invention will be explained. The third embodiment is such that a method according to the second embodiment is applied to a data write operation. Specifically, the third embodiment relates to a method of forming data to be written into page size data by aggregating data when write data has a data size smaller than the page size at the time of writing data. First, a process carried out mainly by the card controller 12 will be explained using FIG. 15. FIG. 15 is a flowchart to help explain the processing in the card controller 12.

As shown in FIG. 15, the processes in step S10 to step S17 are the same as those in the first embodiment and an explanation of them will be omitted. If the result of the determination in step S15 has shown that the data size of the write data is smaller than the page size (No in step S16), the MCU 22 of the card controller 13 outputs a write cancel instruction to the flash memory 11 (step S50). The write cancel instruction is an instruction to cause the flash memory 11 to stop a subsequent write operation. Then, the MCU 22 outputs a data read instruction to the flash memory 11 (step S51). The MCU 22 supplies not only the read instruction but also the address for the data to be read to the flash memory 11. The data to be read in step S51 forms just one-page-size data when it is aggregated with the data determined to fall short of the page size in step S15 and step S16.

Then, when data is read at the flash memory 11, the MCM 22 performs error detection and error correction on the read data (step S52). Thereafter, the MCU 22 transfers only the error-corrected data to the flash memory 11 and further instructs the flash memory 11 to write the data to the data cache 33 (step S53).

Figure 16:
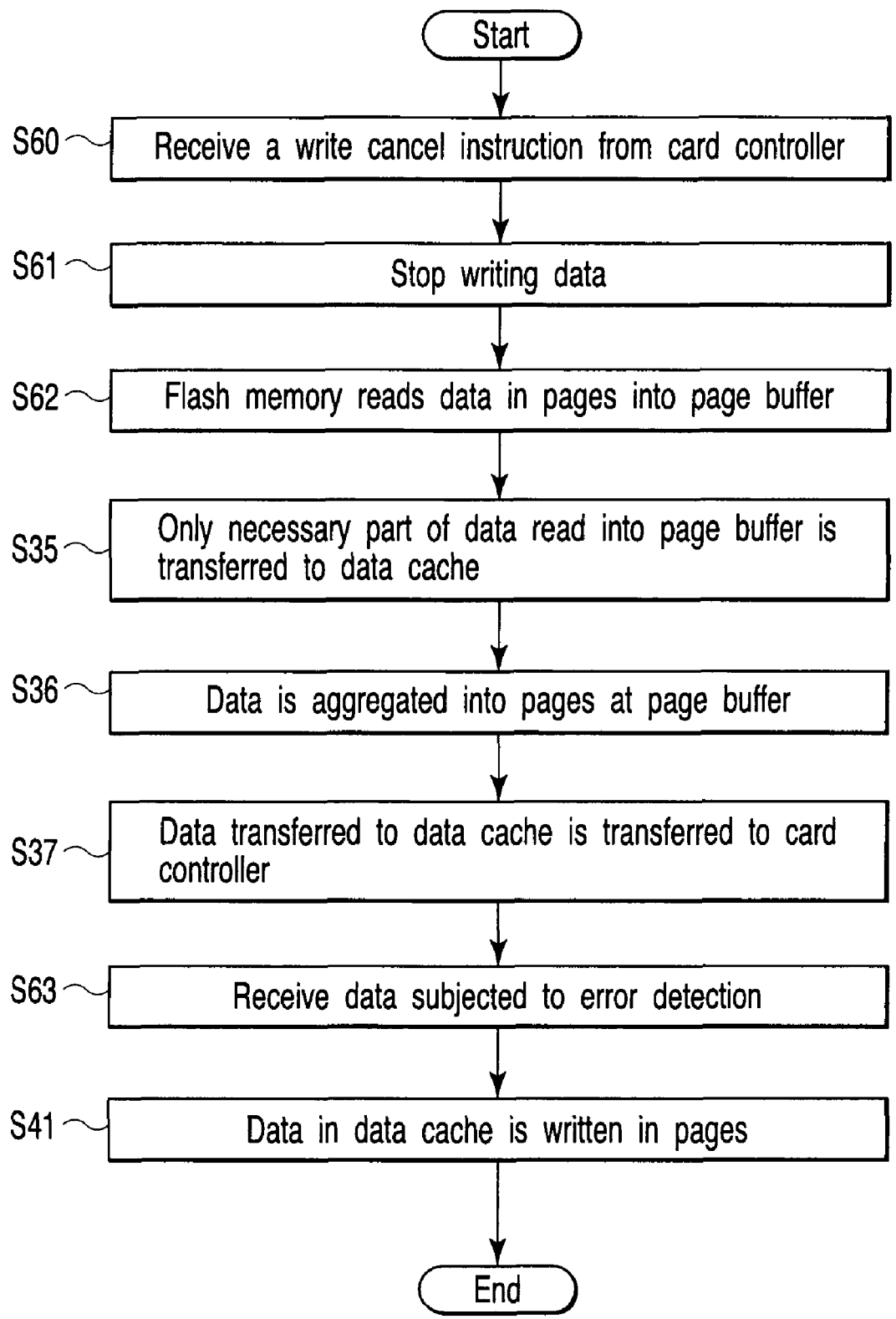
FIG. 16 is a flowchart to help explain the processing in a NAND flash memory in a data writing method for the flash memory of the third embodiment.

Next, using FIG. 16, a process carried out mainly by the NAND flash memory 11 will be explained. In the third embodiment, an operation when a write cancel instruction is output in step S50 will be explained. The remaining operation is the same as in the first embodiment. FIG. 16 is a flowchart to help explain the processing in the flash memory 11.

As shown in FIG. 16, first, the flash memory 11 receives a write cancel instruction from the card controller 12 (step S60). Receiving the write cancel instruction, the flash memory 11 stops writing data and holds the data in the data cache 33 as it is (step S61). Then, on the basis of the read instruction given from the card controller 12 in step S51, the flash memory 11 reads data in pages into the page buffer 31 (step S62). Of the data read into the page buffer 31, only the necessary data is transferred to the data cache 33 (step S35). As a result, the data cache 33 holds the write data falling short of the page size and the data falling short of the page size read in step S62, which are aggregated to produce the same size as one page (step S36). That is, two data items are aggregated into page-size data. Thereafter, the data transferred to the data cache 33 in step S35 is transferred to the buffer 26 of the memory controller 12 (step S37). The processes in step S35 to step S37 are as explained in the second embodiment.

Thereafter, if the data has been corrected, the corrected data is received from the MCU 22 (step S63) and then the data in the data cache 33 is written into a page corresponding to the original row address (step S41).

Figure 17:
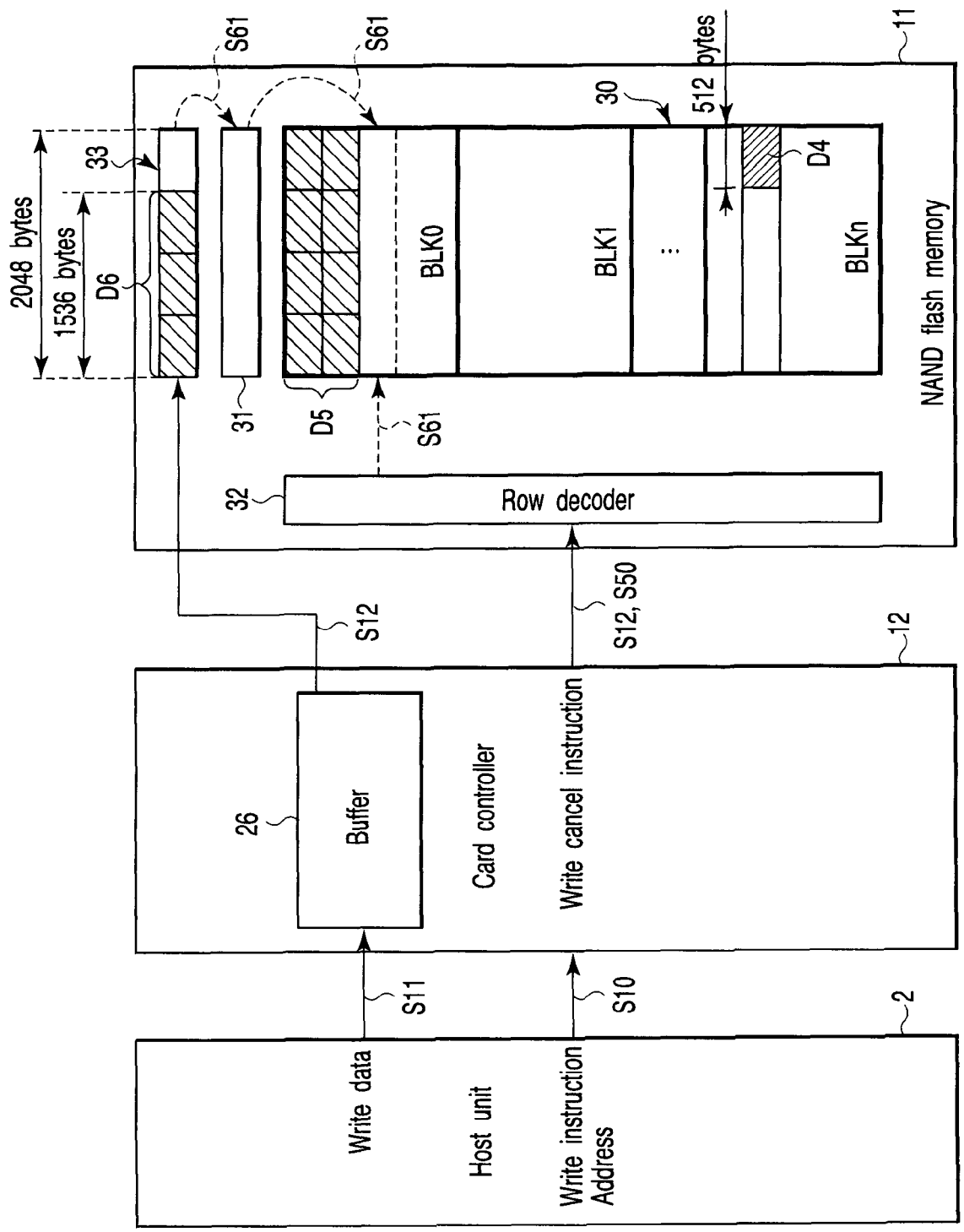
FIGS. 17 to 19 are block diagrams of a memory system according to the third embodiment, showing the way data is aggregated.
Figure 18:
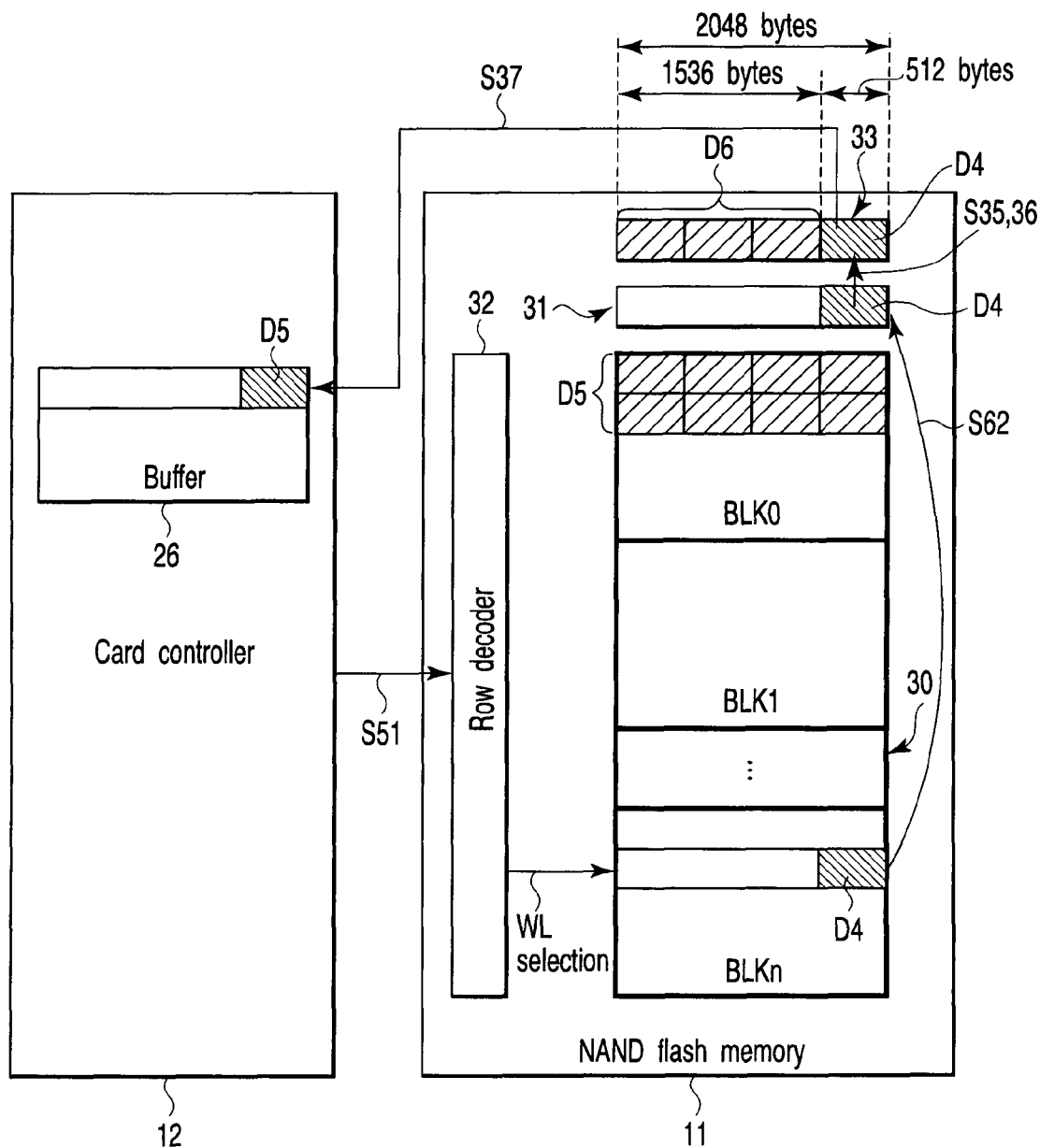
Figure 19:
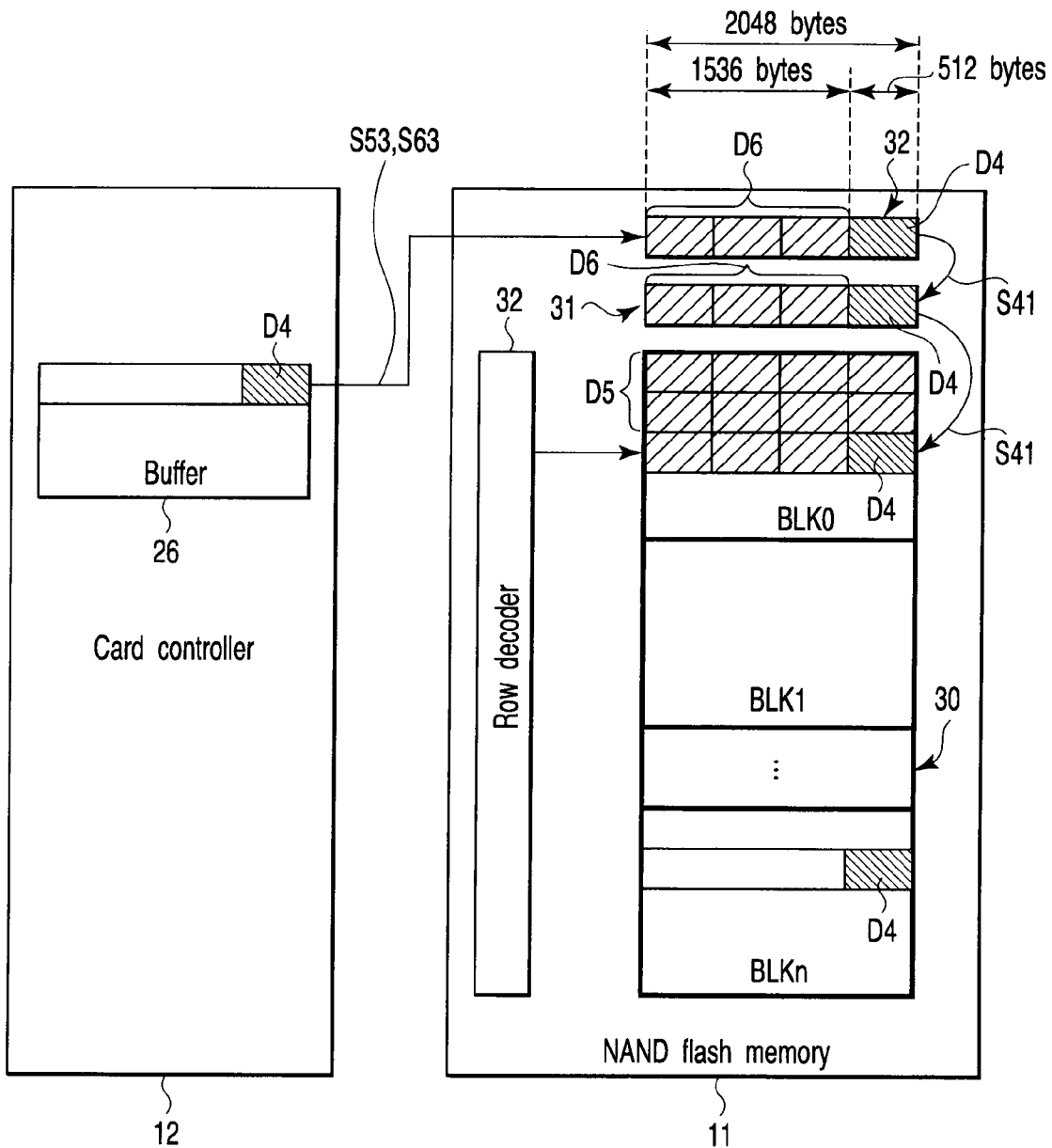

The way the write operation is carried out will be explained using FIGS. 17 to 19. FIG. 17 is a block diagram of the memory system. FIGS. 18 and 19 are block diagrams of the memory card. In FIGS. 17 to 19, the data size of one page is 2048 bytes and the card controller 12 transfers data in units of 512 bytes to the flash memory 11. In the figures, the shaded areas show write data. As shown in FIG. 17, in a state where data D4 whose data size is smaller than the page size, for example, a 512-byte data size, has been written in memory block BLKn, it is assumed that data D5 whose data size corresponds to two pages (2048×2=4096 bytes) and data D6 whose data size is smaller than the page size, for example, a 1536-byte data size, are written sequentially in memory block BLK0. Then, consider a case where data D5 has already written in memory block BLK0 and data D6 is written in an address continuous with data D5.

First, as shown in FIG. 17, since data D6 falls short of the page size, the MCU 22 outputs a write cancel instruction to the flash memory 11. Then, the row decoder 32 of the flash memory 11 makes the word line WL unselected, thereby stopping the operation of writing data D6 transferred to the data cache 33 into memory block BLK0.

Next, as shown in FIG. 18, the MCU 22 outputs to the flash memory 11, for example, a read instruction to read data D4 from memory block BLKn and an address. In response to this, the flash memory 11 reads the data in the page including data D4 from memory block BLKn in pages into the data buffer 31. Of the page data read into the data buffer 31, only data D4 of the 512-byte data size is transferred to the data cache 33. At this time, since 1536-byte data D6 is held in the data cache 33, there is a 512-byte free area left. Thus, 512-byte data D4 is transferred to the free area. As a result, in the data cache 33, data D6 and data D4 are aggregated into exactly a one-page size of data. Moreover, data D4 in the data cache 33 is transferred to the buffer 26 of the card controller 12, followed by error detection and error correction.

Thereafter, as shown in FIG. 19, when error correction has been performed, the corrected data is written into the data cache 33, with the result that data D6 and data D4 held in the data cache 33 are written into the same page in memory block BLK0. The page into which data D4 and data D6 are written is an area corresponding to an address continuous with data D5 where data D6 was to originally be written.

The memory system with the above configuration produces not only the effect in item (2) explained in the second embodiment but also the effect in item (3) below.

(3) The data aggregating process can be made more efficient.

With the memory system of the third embodiment, using data exchange between the page buffer 31 and data cache 33 in units less than page units, data is aggregated in writing data. This makes it possible to carry out the data aggregating process efficiently.

As described above, with the configuration according to each of the first to third embodiments, the operating speed of the NAND flash memory can be improved. When data is aggregated in the second and third embodiments, information on what data should be read and aggregated to produce exactly one-page data size is held by the card controller 12 in, for example, the RAM 25 in the form of a table. Specifically, since the card controller 12 has grasped in what address what data size of data has been written, any suitable one of them is selected and a read instruction is issued.

Figure 20:
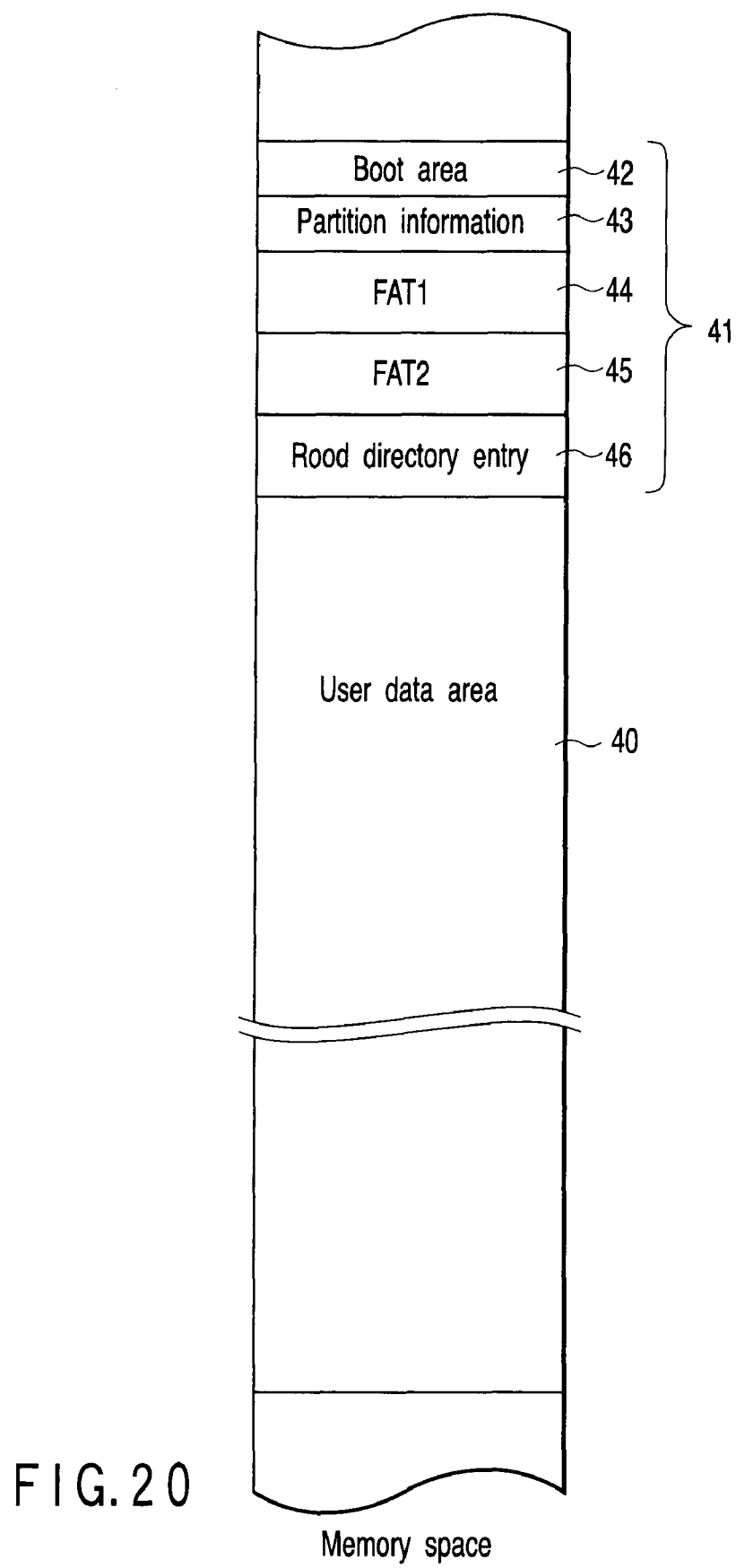
FIG. 20 is a conceptual diagram of the memory space of a NAND flash memory included in a memory system according to each of the second and third embodiments.

Furthermore, applying the second and third embodiments to a file system produces a more prominent effect. Hereinafter, the file system will be explained briefly. The file system is a system of managing files (data) stored in a memory. Hereinafter, explanation will be given taking a file allocation table (FAT) file system as an example. In the file system, a method of creating directory information, such as files or folders, in a memory, a method of moving files or folders, a method of erasing files or folders, a method of storing data, management area locations, a method of using management areas, and others are determined. FIG. 20 is a conceptual diagram of the memory space of a NAND flash memory 11 according to each of the above embodiments.

As shown in FIG. 20, the memory space is roughly divided into a user data area 40 and a management area 41. The user data area 40 is an area which stores net data written by the user.

The management area 41 includes, for example, a boot area 42, a partition information area 43, a FAT1 (44), a FAT2 (45), and a root directory entry area 46. The boot area 42 stores, for example, boot information. The partition information area 43 stores partition information. The FAT1 and FAT2 store in what address data has been stored. Hereinafter, FAT1 and FAT2 will be explained briefly.

The user data area 40 includes a plurality of areas called clusters. If data to be written is larger than a cluster size, the data is divided into clusters, which are then stored. At this time, clusters into which data is written may be inconsecutive. That is, an item of data is written into clusters separate from one another. In this case, management data for indicating in which clusters the divided items of data have been written is stored in FAT1 and FAT2.

The root directory entry area 46 stores information on root directory entries. The root directory entry area 46 further stores not only file names or folder names, file sizes, attributes, and file update time and date but also flags indicating which clusters shown in FAT1 and FAT2 are first clusters of files.

Each item of data (hereinafter, referred to as management data) in the management area, particularly FAT1 and FAT2, is frequently updated and has a small data size, generally falling short of one page. In a NAND flash memory, since data is prevented from being overwritten, data frequently updated is written temporarily into any erase memory block (referred to as a cache block). Each time the data is updated, it is written into the cache block sequentially. Then, with specific timing, the latest data in the cache block is transcribed into another memory block (which is referred to as cache reconstruction). From the viewpoint of the speeding up of cache reconstruction, it is desirable to use a method according to the first to third embodiments. On this point, explanation will be given below.

Figure 21:
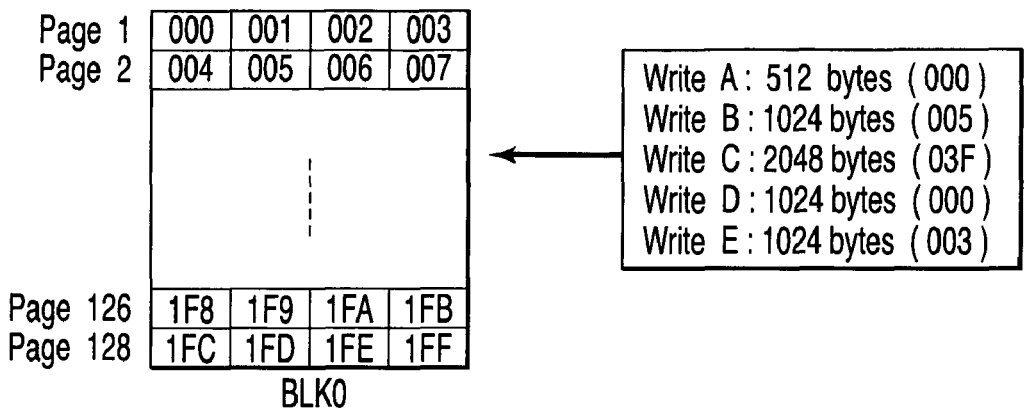
FIG. 21 is a block diagram of a flash memory.

FIG. 21 is a conceptual diagram of memory block BLK0. As shown in FIG. 21, suppose memory block BLK0 includes 128 pages and addresses "000," "001," "002," . . . "1FF" are allocated in units of 512 bytes in each page. Consider a case where five writes A to E have been done on memory block BLK0. In write A, 512 bytes of data are written in address "000." In write B, 1024 bytes of data are written in address "005." In write C, 2048 bytes of data are written in address "03F." In write D, 1024 bytes of data are written in address "000." In write E, 1024 bytes of data are written in address "003." These items of write data are data items frequently updated, such as management data. Suppose they are first written into the cache block.

Figure 22:
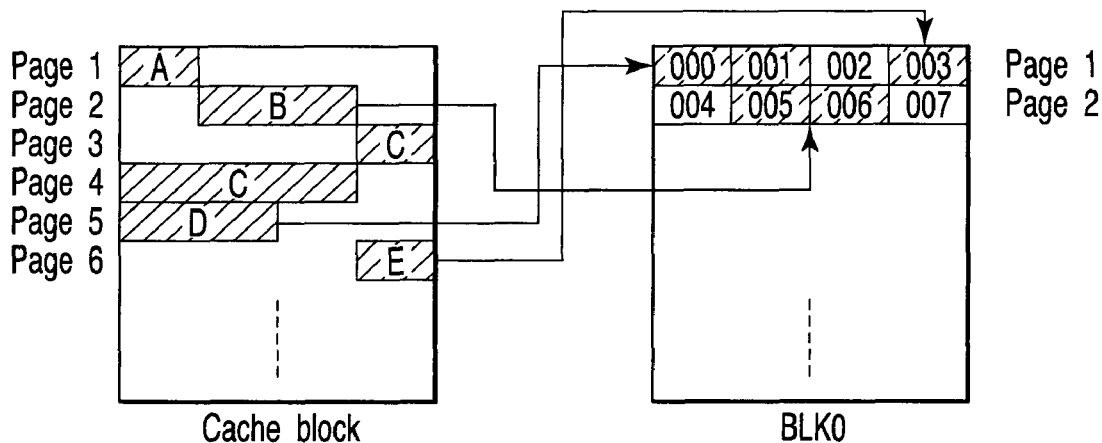
FIG. 22 is a block diagram of a flash memory, showing the way data is aggregated.

First, cache reconstruction by a conventional method will be explained using FIG. 22. FIG. 22 is a conceptual diagram of the cache block and memory block BLK0, showing the way cache reconstruction is performed.

First, write A is done on page 1 of the cache block. Next, write B is done on page 2 of the cache block. Then, write C is done on page 3 and page 4 of the cache block. Then, write D is done on page 6 of the cache block.

Thereafter, cache reconstruction is performed. First, data to be written in address "000" is the data written in write D. That is, the data written in write A has been overwritten with the data in write D and becomes unnecessary. Therefore, first, data is read from page 5 of the cache block. Next, since address "002" of memory block BLK0 has not been updated, the data in address "002" of memory block BLK0 is read to use the original data as it is. Moreover, since the data in address "003" is the data written in write E, data is read from page 6 of the cache block. As a result of the three data reads, data items to be written into page 1 of memory block BLK0 are aggregated.

Figure 23:
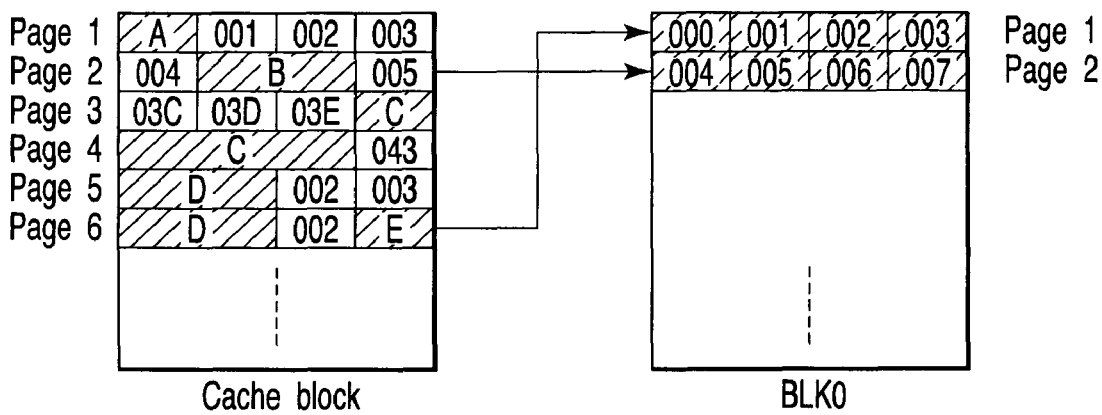
FIG. 23 is a block diagram of a flash memory according to a modification of the second and third embodiments, showing the way data is aggregated.

Next, cache reconstruction when the embodiments are applied will be explained using FIG. 23. FIG. 23 is a conceptual diagram of the cache block and memory block BLK0, showing the way cache reconstruction is performed.

First, as in the conventional method, write A is done on page 1 of the cache block. Next, write B is done on page 2 of the cache block. Then, write C is done on page 3 and page 4 of the cache block. Then, write D is done on page 6 of the cache block. These write operations differ from those in the conventional method in that one-page size of data obtained by aggregating data with the data in memory block BLK0 is written into the cache block.

Specifically, when page 1 is written into, 512 bytes of data given in write A and 1536 bytes of data in address "001" to "003" of memory block BLK0 are aggregated and written into page 1. The same holds true for writing into page 2 and onward. When page 6 is written into, 512 bytes of data given in write E, data D from the cache block, and data in address "002" are aggregated.

Thereafter, cache reconstruction is performed. The data corresponding to page 1 of memory block BLK0 is held in pages 1, 5, and 6 of the cache block. Of them, page 6 which holds the latest data is read and written into page 1 of memory block BLK0. The data in page 2 of the cache block is transcribed into page 2 of memory block BLK0.

Specifically, in the embodiments, when data is written into the cache block, write data and another item of data in the preceding block are aggregated into one-page size of data. The resulting data is written into the cache block. Therefore, at the time of cache reconstruction, data is updated in pages. Accordingly, a read operation at the time of cache reconstruction has to be carried out only once per page, which makes it possible to speed up cache reconstruction.

Moreover, memory block BLK0 has to be caused to correspond to the cache block for each 512-byte area in FIG. 22, leading to a tremendous amount of information. However, in the case of FIG. 23 where the embodiments have been applied, memory block BLK0 has to be caused to correspond to the cache block in pages, which enables the amount of correspondence information to be decreased.

Furthermore, the above method is desirable from the viewpoint of not only cache reconstruction and correspondence relationship but also reading from the host unit. That is, to perform file system operations, including the update of FATs, efficiently, the host unit generally reads data in a batch to some extent in advance. Specifically, in the flash memory, small data size random writing may be performed in a FAT area or the like and a specific large amount of data obtained by aggregating the small data sizes may be read. In such a case, too, with the method of the third embodiment, small sizes of data get together in pages, enabling the operating speed to be improved, since the read operation at the cache reconstruction has to be carried out only once per page.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a nonvolatile semiconductor memory which has a plurality memory blocks each including memory cells capable of holding data, the data in each of the memory blocks being erased simultaneously, and the data being written simultaneously in pages in each of the memory blocks, each of the pages being a set of a plurality of memory cells; and
a controller which outputs a first write instruction, a first row address, write data, and a second write instruction sequentially to the nonvolatile semiconductor memory, the first write instruction being an instruction to cause the nonvolatile semiconductor memory to recognize a start of a data write operation is started, the second write instruction being an instruction to cause the nonvolatile semiconductor memory to write the write data into the memory block, the controller being configured to issue a change instruction for the transferred first row address and a second row address differing from the first row address, the nonvolatile semiconductor memory writing the write data into the memory cells corresponding to the first row address when the change instruction has not been issued, and writing the write data into the memory cells corresponding to the second row address without receiving the write data again when the change instruction has been issued.

2. The system according to claim 1, wherein the controller, when a data size of the write data is smaller than a page size, issues the change instruction and the second row address, and
the second row address corresponds to the memory block differing from the memory block corresponding to the first row address.

3. The system according to claim 1, wherein
the controller, when issuing the change instruction, outputs the change instruction and the second row address sequentially to the nonvolatile semiconductor memory after outputting the write data to the nonvolatile semiconductor memory, and
the second instruction is output to the nonvolatile semiconductor memory after the second row address is output.

4. The system according to claim 1, wherein the controller determines whether a data size of the write data is smaller than a page size when having received a write access end or a stop instruction for the data from a host unit.

5. The system according to claim 1, wherein the write data is management data in a FAT file system.

6. A memory system comprising:
a nonvolatile semiconductor memory which has a plurality memory blocks each including memory cells capable of holding data, the data in each of the memory blocks being erased simultaneously, and the data being written simultaneously in pages in each of the memory blocks, each of the pages being a set of a plurality of memory cells; and
a controller which controls the operation of the nonvolatile semiconductor memory, the nonvolatile semiconductor memory including
the memory blocks,
a first buffer circuit which exchanges the data with the memory blocks in pages and is capable of holding data with a page size, and
a second buffer circuit which exchanges the data with the first buffer circuit and the controller in data units smaller than the page size and is capable of holding data with the page size, wherein
the controller issues a data read instruction, a first row address, and a second row address to the nonvolatile semiconductor memory,
the nonvolatile semiconductor memory reads, into the second buffer circuit, first page data which corresponds to the first row address and includes first data falling short of the page size and further reads, into the first buffer circuit, second page data which corresponds to the second row address and includes second data falling short of the page size, a size of combined first and second data corresponding to the page size, and
the first buffer circuit transfers only the second data in the second page data to an area which holds data other than the first data in the second buffer circuit.

7. The system according to claim 6, wherein the second buffer circuit transfers the first data and the second data to the controller,
the controller checks the transferred first data and second data for an error and, if having detected an error, corrects the error and transfers at least either the error-corrected first data or second data to the second buffer circuit, and
if the controller has corrected the error, at least either the corrected first or second data is written into the nonvolatile semiconductor memory.

8. The system according to claim 7, wherein the controller, if the result of checking for an error has shown that no error has been detected, does not transfer the second data to the second buffer circuit, and
the first and second data held in the second buffer circuit are written into the nonvolatile semiconductor memory.

9. A memory system comprising:
a nonvolatile semiconductor memory which has a plurality memory blocks each including memory cells capable of holding data, the data in each of the memory blocks being erased simultaneously, and the data being written simultaneously in pages in each of the memory blocks, each of the pages being a set of a plurality of memory cells; and
a controller which controls the operation of the nonvolatile semiconductor memory, the nonvolatile semiconductor memory including
the memory blocks,
a first buffer circuit which exchanges the data with the memory blocks in pages and is capable of holding data with a page size, and
a second buffer circuit which exchanges the data with the first buffer circuit and the controller in data units smaller than the page size and is capable of holding data with the page size, wherein
the controller, when data is written, not only issues a first row address but also transfers first data to the second buffer circuit and, when the data size of the first data transferred to the second buffer circuit is smaller than the page size, issues a write stop instruction, a data read instruction, and a second row address,
the nonvolatile semiconductor memory, in response to the write stop instruction, stops the write operation while holding the first data in the second buffer circuit and, in response to the read instruction, reads page data corresponding to the second row address and including second data falling short of the page size into the first buffer circuit, a size of combined first and second data corresponding to the page size,
the first buffer circuit transfers only the second data in the page data to an area which holds data other than the first data in the second buffer circuit, and
the second buffer circuit writes the first and second data simultaneously into the memory cells corresponding to the first row address.

10. The system according to claim 9, wherein the second buffer circuit transfers the second data transferred from the first buffer circuit to the controller,
the controller checks the transferred second data for an error and, if having detected an error, corrects the error and transfers the error-corrected second data to the second buffer circuit, and
the first data held in the second buffer circuit and the second data transferred to the second buffer circuit are written into the nonvolatile semiconductor memory.

11. The system according to claim 10, wherein the controller, if the result of checking for an error has shown that no error has been detected, does not transfer the second data to the second buffer circuit, and
the first and second data held in the second buffer circuit are written into the nonvolatile semiconductor memory.

12. A card controller for controlling a nonvolatile semiconductor memory comprising:
a host interface which is configured to be connectable to a host unit and receives write data and a first row address from the host unit; and
an arithmetic processing unit which outputs a first write instruction, the first row address, the write data, and a second write instruction sequentially to the nonvolatile semiconductor memory having a plurality of memory blocks each including memory cells capable of holding data and issues a change instruction for the first row address and a second row address differing from the first row address, the data in each of the memory blocks being erased simultaneously, the write data being written simultaneously in pages in each of the memory blocks, each of the pages being a set of a plurality of memory cells in each of the memory blocks, the first write instruction being an instruction to cause the nonvolatile semiconductor memory to recognize a start of a data write operation is started, the second write instruction being an instruction to cause the nonvolatile semiconductor memory to write the write data into the memory block, and the arithmetic processing unit, according to the change instruction, instructing the nonvolatile semiconductor memory to write the write data into the memory cells corresponding to the second row address without supplying the nonvolatile semiconductor memory with the write data again.

13. The controller according to claim 12, wherein the arithmetic processing unit issues the change instruction and the second row address when a data size of the write data is smaller than a page size, and the second row address corresponds to the memory block differing from the memory block corresponding to the first row address.

14. The controller according to claim 12, wherein the controller, when issuing the change instruction, outputs the change instruction and the second row address sequentially to the nonvolatile semiconductor memory after outputting the write data to the nonvolatile semiconductor memory, and the second instruction is output to the nonvolatile semiconductor memory after the second row address is output.

15. The controller according to claim 12, wherein the arithmetic processing unit determines whether the data size of the write data is smaller than a page size when having received a write access end or a stop instruction for the data from the host unit.

* * * * *